(12) United States Patent
Ikeda et al.

(10) Patent No.: US 8,261,999 B2
(45) Date of Patent: Sep. 11, 2012

(54) SEMICONDUCTOR DEVICE

(75) Inventors: Takayuki Ikeda, Atsugi (JP); Yoshiyuki Kurokawa, Sagamihara (JP); Masami Endo, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 12/943,591

(22) Filed: Nov. 10, 2010

(65) Prior Publication Data

US 2011/0057725 A1     Mar. 10, 2011

Related U.S. Application Data

(63) Continuation of application No. 11/812,990, filed on Jun. 22, 2007, now Pat. No. 7,832,647.

(30) Foreign Application Priority Data

Jun. 30, 2006   (JP) ................................ 2006-180585

(51) Int. Cl.
*G06K 19/06* (2006.01)
(52) U.S. Cl. ...................................... 235/492
(58) Field of Classification Search .............. 235/492; 340/540; 327/524, 581
See application file for complete search history.

(56) References Cited

U.S. PATENT DOCUMENTS

| | | | |
|---|---|---|---|
| 5,521,590 A | 5/1996 | Hanaoka et al. | |
| 6,375,082 B1 | 4/2002 | Kobayashi et al. | |
| 6,437,609 B1 | 8/2002 | Chehadi | |
| 6,549,071 B1 | 4/2003 | Paul et al. | |
| 6,659,352 B1 | 12/2003 | Asada et al. | |
| 6,727,754 B2 | 4/2004 | Dupuis et al. | |
| 6,756,849 B2 | 6/2004 | Dupuis et al. | |
| 6,788,141 B2 | 9/2004 | Paul et al. | |
| 6,809,952 B2 | 10/2004 | Masui | |
| 6,816,011 B2 | 11/2004 | Paul et al. | |
| 6,917,245 B2 | 7/2005 | Dupuis et al. | |
| 6,927,630 B2 | 8/2005 | Dupuis et al. | |

(Continued)

FOREIGN PATENT DOCUMENTS

EP   0 596 124   5/1994

(Continued)

OTHER PUBLICATIONS

K. Finkenzeller, "41.8 Practical Side of Transponder Detection," RFID Handbook the Second Edition, Principles and Applications of Non-Contact IC Cards, May 31, 2004, pp. 69-71, The Nikkan Kogyo Shimbun.

(Continued)

*Primary Examiner* — Seung Lee
(74) *Attorney, Agent, or Firm* — Eric J. Robinson; Robinson Intellectual Property Law Office, P.C.

(57) ABSTRACT

A semiconductor device such as an RFID, which can easily generate a given stable potential, is provided. Circuits included in a semiconductor device are categorized depending on whether a given stable power source potential is necessary. A power source potential generated from a wireless signal received by an antenna with the use of the antenna and a rectifier circuit is supplied to a circuit which needs a given stable power source potential through a regulator. On the other hand, a power source potential generated by the rectifier circuit is supplied to a circuit other than the circuit which needs the arbitrary power source potential. Thus, a semiconductor device including a regulator circuit easily designed with a smaller layout can be provided, and the semiconductor device can easily generate a given stable power source potential.

20 Claims, 17 Drawing Sheets

U.S. PATENT DOCUMENTS

| | | |
|---|---|---|
| 7,005,905 B2 | 2/2006 | Hsu et al. |
| 7,109,845 B2 | 9/2006 | Fischer |
| 7,125,382 B2 | 10/2006 | Zhou et al. |
| 7,181,179 B2 | 2/2007 | Fujisawa et al. |
| 7,224,232 B2 | 5/2007 | Paul et al. |
| 7,241,266 B2 | 7/2007 | Zhou et al. |
| 7,271,076 B2 | 9/2007 | Yamazaki et al. |
| 7,296,742 B2 | 11/2007 | Enomoto et al. |
| 7,297,112 B2 | 11/2007 | Zhou et al. |
| 7,452,786 B2 | 11/2008 | Dozen et al. |
| 7,494,066 B2 | 2/2009 | Koyama et al. |
| 7,554,383 B2 | 6/2009 | Arisawa et al. |
| 7,710,199 B2 | 5/2010 | Bocock et al. |
| 7,760,023 B2 | 7/2010 | Bockelman et al. |
| 7,768,405 B2 | 8/2010 | Yamazaki et al. |
| 7,804,364 B2 | 9/2010 | Dupuis et al. |
| 7,821,322 B2 | 10/2010 | Arisawa et al. |
| 2005/0052167 A1 | 3/2005 | Paul et al. |
| 2005/0052235 A1 | 3/2005 | Paul et al. |
| 2005/0052236 A1 | 3/2005 | Paul et al. |
| 2005/0052237 A1 | 3/2005 | Paul et al. |
| 2006/0208799 A1 | 9/2006 | Paul et al. |
| 2007/0096816 A1 | 5/2007 | Paul et al. |
| 2008/0033273 A1 | 2/2008 | Zhou et al. |

FOREIGN PATENT DOCUMENTS

| | | |
|---|---|---|
| EP | 1058376 A | 12/2000 |
| EP | 1280099 A | 1/2003 |
| EP | 1612650 A | 1/2006 |
| JP | 2001-125653 A | 5/2001 |
| JP | 2001-238372 A | 8/2001 |
| JP | 2001-344578 A | 12/2001 |
| JP | 2003-036427 A | 2/2003 |
| JP | 2005-208959 A | 8/2005 |
| JP | 2006-012002 A | 1/2006 |
| WO | WO-01/92970 | 12/2001 |
| WO | WO 02-23716 | 3/2002 |
| WO | 2005/057658 | 6/2005 |
| WO | 2005/076358 | 8/2005 |
| WO | WO 2005-112744 | 12/2005 |
| WO | 2006/028258 | 3/2006 |
| WO | 2006/095791 | 9/2006 |

OTHER PUBLICATIONS

Search Report (Application No. 07012525.7) dated Sep. 7, 2007 Eng.
Search Report (Application No. 07012525.7) dated Jan. 21, 2008.
Office Action (European Patent Application No. 07012525.7) dated Mar. 12, 2009.

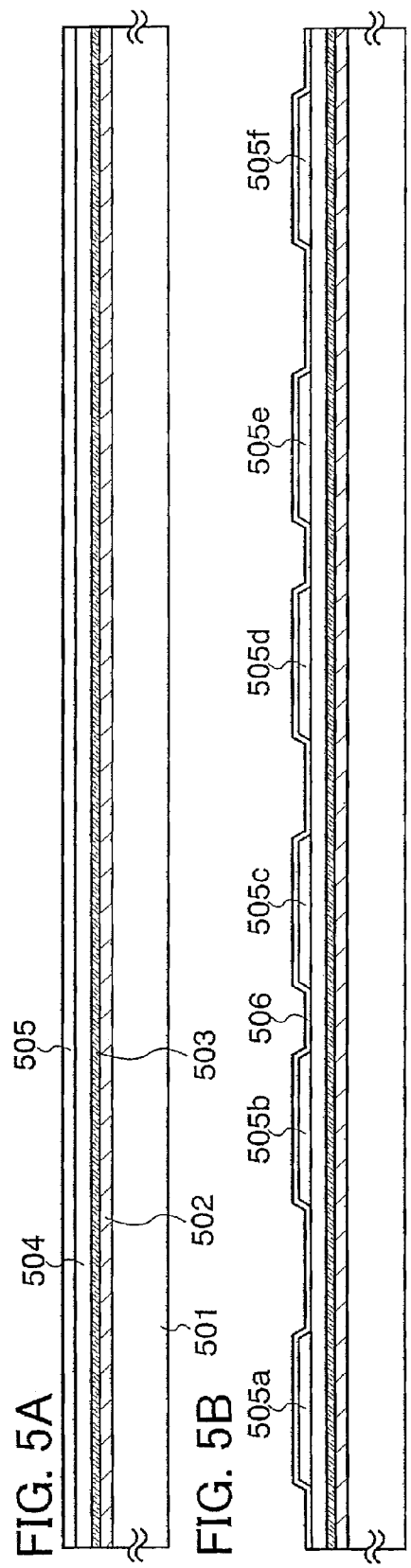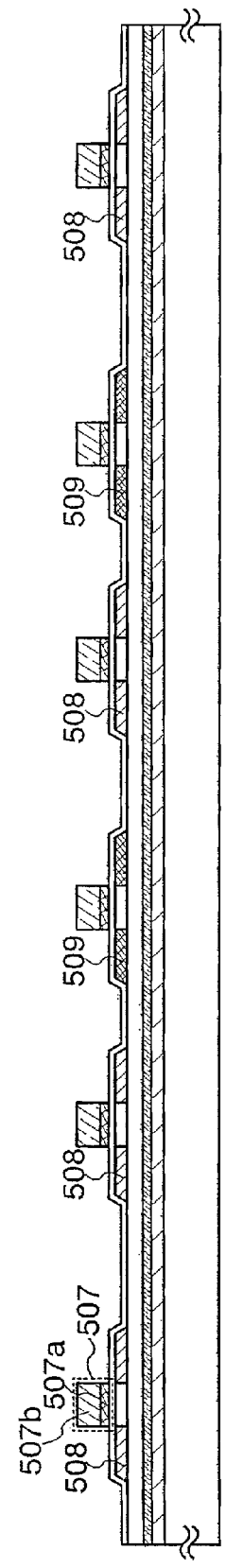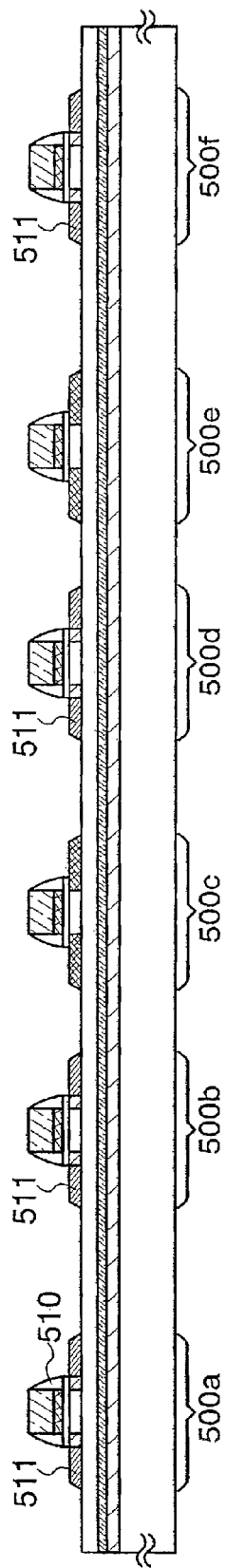

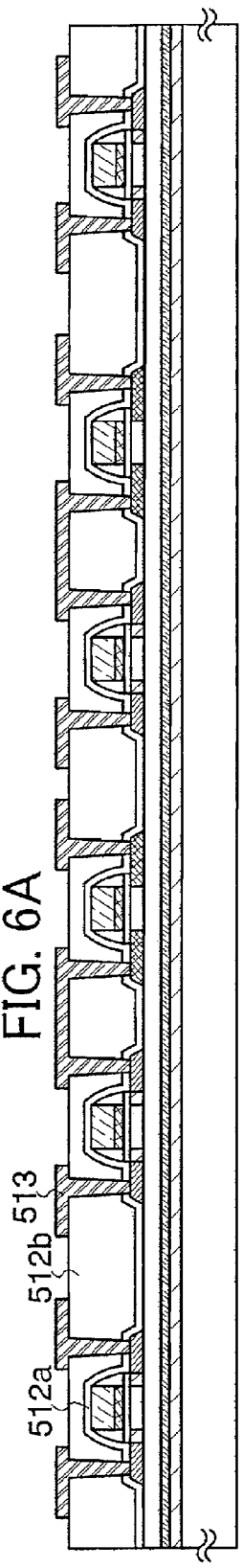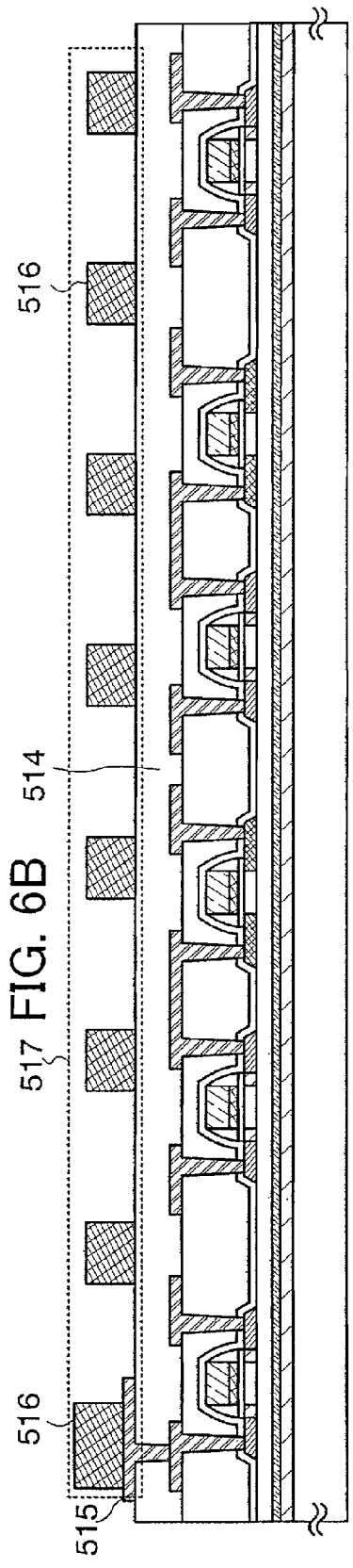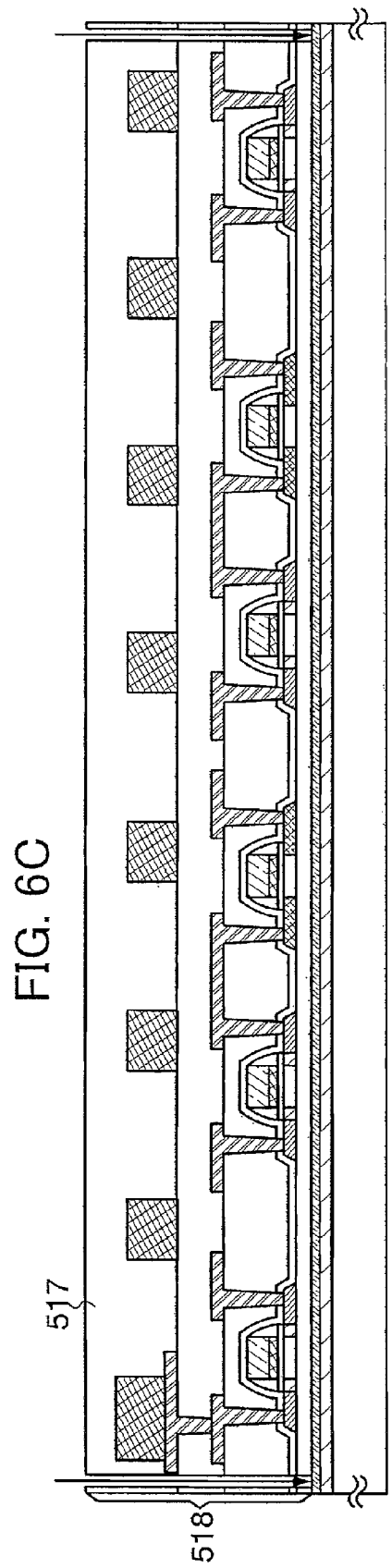

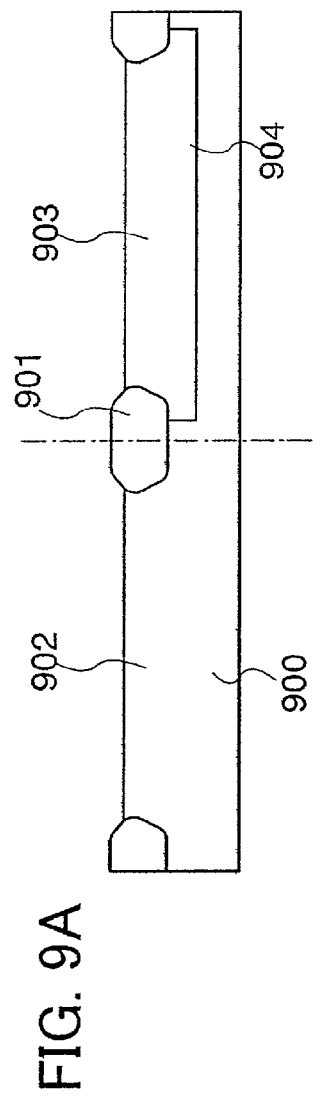
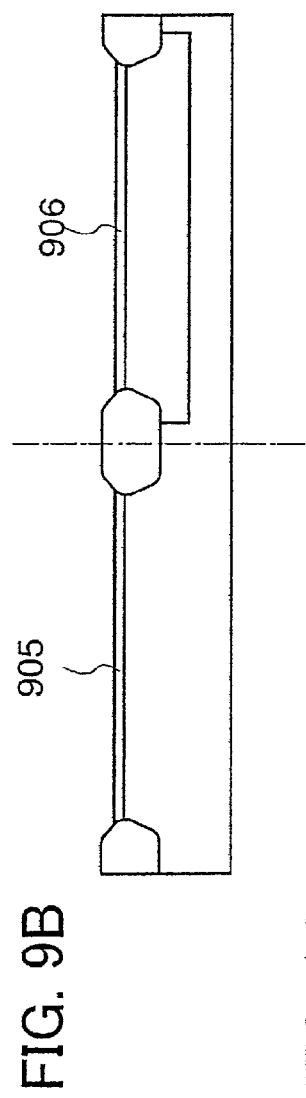
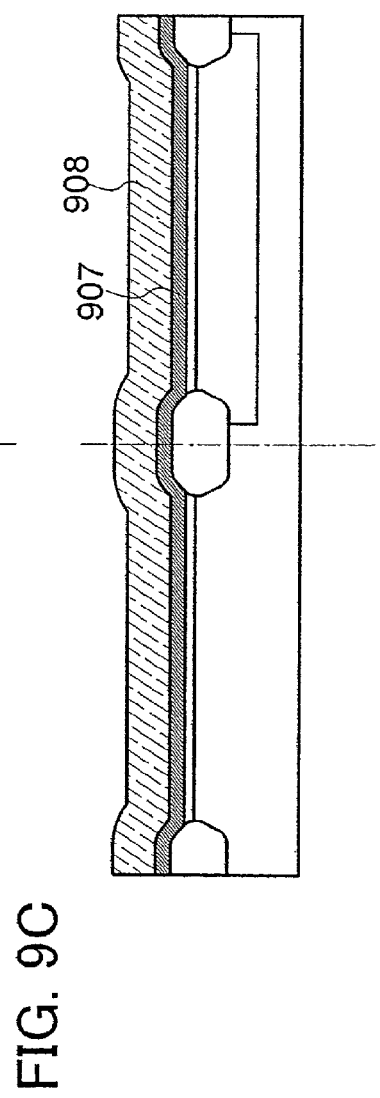
FIG. 9A
FIG. 9B
FIG. 9C

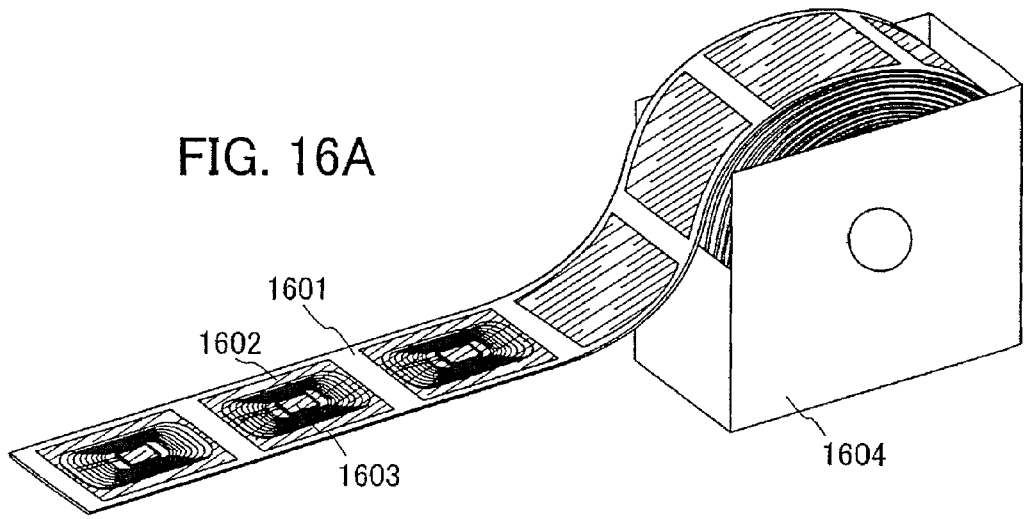
FIG. 16A
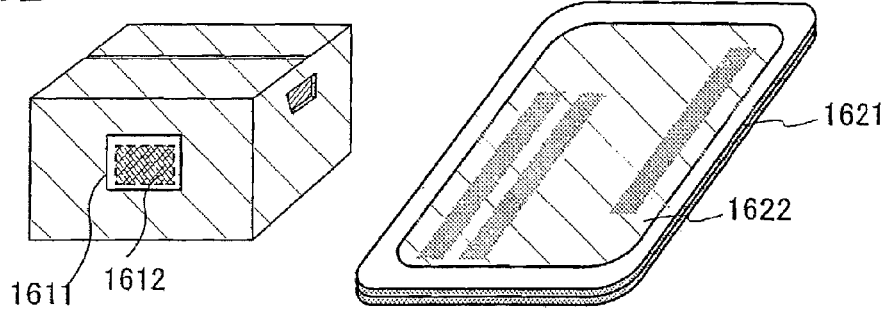
FIG. 16B
FIG. 16C
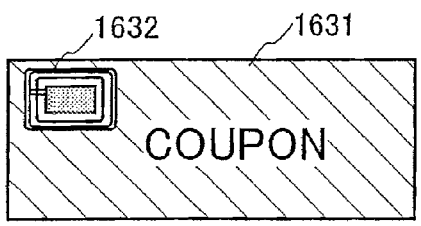
FIG. 16D
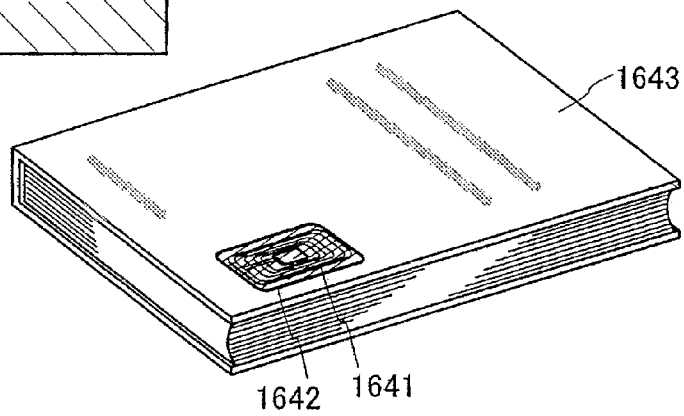
FIG. 16E

SEMICONDUCTOR DEVICE

BACKGROUND OF THE INVENTION

1. Field of the Invention

The present invention relates to a semiconductor device such as an RFID formed over a glass substrate or a flexible substrate. The present invention also relates to a semiconductor device which performs communication without contact.

2. Description of the Related Art

In recent years, an individual identification technology using wireless communication through an electromagnetic field, a radio wave, or the like has attracted attention. In particular, as a semiconductor device which communicates data by wireless communication, an individual identification technology using an RFID (Radio Frequency Identification) tag has attracted attention. An RFID tag (hereinafter, simply referred to as an RFID) is also called an IC (Integrated Circuit) tag, an RF tag, a wireless tag, an electronic tag, an IC chip, or a wireless chip. The individual identification technology using an RFID has come to help production, management, or the like of an individual object, and is anticipated to be applied to personal authentication.

An RFID includes the one which does not have a power source and can be driven using power of an external radio wave or electromagnetic wave. Such an RFID generates a DC voltage from a signal of an external radio wave, electromagnetic wave, or the like with the use of a rectifier, and operates with the voltage that is further dropped to a certain value or lower through a controller such as a regulator (for example, see Non-Patent Document 1: Klaus Finkenzeller, "RFID hand book the second edition, a principle of a non-contact IC card and application thereof", translated by SOFEL Co., Ltd., published by Nikkan Kogyo Shimbun, Ltd., pp. 69-71)

SUMMARY OF THE INVENTION

A circuit configuration of a conventional RFID is shown in FIG. 17. The RFID shown in FIG. 17 includes an antenna 1001, a rectifier circuit 1002, a regulator circuit 1003, a circuit group 1004 forming the RFID, which includes a clock generation circuit, a logic circuit, and the like. Note that in order to supply a stable DC voltage of a certain value or less to all the circuits included in the circuit group 1004 when the RFID is operated, an area occupied by the regulator circuit 1003 is increased; therefore, the RFID is difficult to be designed.

Communication between an RFID and a reader-writer is controlled by clock. Therefore, if clock frequency fluctuates in operation, the RFID cannot accurately interpret a command or data each from the reader-writer to the RFID. In addition, if clock frequency fluctuates in operation, the reader-writer cannot accurately interpret a response from the RFID to the reader-writer.

The clock is generated from a wireless signal. In the case where a transistor included in a circuit of the RFID operates sufficiently with the frequency of a carrier wave of the wireless signal, clock is generated by directly frequency-dividing the carrier wave by the circuit of the RFID. In the case where the transistor included in the circuit of the RFID does not operate sufficiently with the frequency of the carrier wave of the wireless signal, clock is generated by a method in which the circuit of the RFID self-oscillates to synchronize the wireless signal, or the like. Note that in the case where the circuit of the RFID self-oscillates, a power source of an oscillating circuit is a power source potential generated by the RFID. Here, a regulator circuit is used so that the power source potential does not fluctuate, thereby converting the power source potential into a given potential.

On the other hand, the logic circuit synchronized with the clock easily causes fluctuation of a power source potential since a state in the logic circuit is changed all at once when a potential of the clock fluctuates. In this specification, a power source noise means fluctuation of a power source potential which supplies power to a circuit by a circuit operation. When power consumption of the circuit which uses an output of the regulator circuit for a power source potential is high, the regulator circuit is necessary to change power greatly in order to suppress a power source noise; therefore, the regulator circuit is further difficult to be designed.

In view of the aforementioned problems, it is an object of the present invention to provide a semiconductor device such as an RFID, in which stable power is supplied to a circuit such as a clock generating circuit, which needs a given stable power source potential, and is provided with a regulator circuit that is easy to be designed.

Circuits included in a semiconductor device are categorized into a first circuit and a second circuit depending on whether a given stable power source potential is necessary. The first circuit is a circuit which needs a given stable power source potential and the second circuit is a circuit other than the first circuit. A power source potential generated with the use of the antenna and a rectifier circuit from a wireless signal received by an antenna is supplied to the first circuit through a regulator. Specifically, an output of a regulator circuit is supplied to at least the first circuit which needs a given stable power source potential as a power source potential, and a power source potential generated by the rectifier circuit is supplied to a circuit other than the circuit which needs the arbitrary power source potential, i.e., the second circuit.

With the aforementioned structure, the regulator circuit can be easily designed with a smaller layout area than the conventional structure of a regulator circuit. Further, power consumption of the regulator circuit can be reduced.

One mode of the present invention is a semiconductor device including an antenna that transmits and receives a signal, a rectifier circuit, a regulator circuit, a first circuit, and a second circuit that communicates a signal with the first circuit. The first circuit is a circuit that needs a given stable potential. A power source potential generated by the antenna and the rectifier circuit is supplied to the first circuit and the second circuit. The power source potential is supplied to the first circuit through the regulator circuit.

Another mode of the present invention is a semiconductor device including an antenna that transmits and receives a signal, a rectifier circuit, a first regulator circuit, a second regulator circuit, a first circuit, and a second circuit that communicates a signal with the first circuit. The first circuit is a circuit that needs a given stable potential. A power source potential generated by the antenna and the rectifier circuit is supplied to the first circuit and the second circuit through the first regulator circuit and the second regulator circuit respectively.

Note that the first regulator circuit and the second regulator circuit may have either the same circuit configuration or different circuit configurations. Further, in the case where they have the same circuit configuration, the sizes of elements included in the first regulator circuit and the second regulator circuit may be the same or different. Even if they have the same circuit configuration or the same size of elements, the regulator circuits can be designed easily compared with a conventional one by application of different loads. In this case, the first regulator circuit can be designed to have more stability than the second regulator circuit.

Another mode of the present invention is a semiconductor device including an antenna that transmits and receives a signal, a rectifier circuit, a regulator circuit, a voltage limiter circuit, a first circuit, and a second circuit that communicates a signal with the first circuit. The first circuit is a circuit that needs a given stable potential. A power source potential generated by the antenna and the rectifier circuit is supplied to the first circuit and the second circuit through the regulator circuit and the voltage limiter circuit respectively.

In the aforementioned structure, a clock generating circuit can be given as the first circuit; however, the first circuit is not limited to this. For example, in the case where a potential of a sensor is detected by an AD converter circuit, fluctuation of the power source potential of the AD converter circuit prevents accurate reading of the potential of the sensor; therefore, it can be said that the AD converter circuit is a circuit that needs a given stable power source potential and also the first circuit. Thus, the first circuit is a circuit that needs a given stable power source potential. In addition, the second circuit is a logic circuit for interpreting, for example, a wireless signal to respond.

Communication of a signal may be conducted between the first circuit and the second circuit through a level shifter circuit.

Also, an RFID may have a built-in ROM that is rewritable. Note that in the built-in ROM, a circuit that needs a given potential belongs to the first circuit and a circuit other than the first circuit belongs to the second circuit.

Note that the RFID extracts a wireless signal as well as generating power from a signal received by an antenna. A power source potential generated by a rectifier circuit may be used in an analog circuit that takes a wireless signal. However, it is more effective in the present invention that circuits that use a potential generated by the rectifier circuit for power, that is, the first circuit and the second circuit use many elements not limiting to some of the elements.

In this specification, as for a potential difference generated in the RFID and supplied to a circuit, a lower potential is referred to as ground as a standard and a higher potential is referred to as a power source potential with respect to the standard. The present invention is described with regard to the power source assuming that the ground is common to circuits; however, the present invention may be applied setting a higher potential as a standard of the circuits conversely. Although a potential of a power source line may vary depending on a location because of parasitic capacitance, the power source line that is not separated by a transistor or a capacitor is regarded as a kind of power source.

A transistor is not particularly limited in the present invention. A thin film transistor (TFT) using a non-single crystalline semiconductor film represented by amorphous silicon or polycrystalline silicon, a transistor formed using a semiconductor substrate or an SOI substrate, a MOS transistor, a junction transistor, a bipolar transistor, a transistor using a compound semiconductor of ZnO, a-InGaZnO, or the like, a transistor using an organic semiconductor or a carbon nanotube, or the like can be applied. Furthermore, a substrate provided with a transistor is not exclusively limited to a certain type. For example, a single crystalline substrate, an SOI substrate, a glass substrate, a plastic substrate, or the like can be used.

Note that in the above description, two kinds of functions of the regulator circuit are used. A first function is to output a given potential and a second function is to stabilize an output potential. As for fluctuation of a power source potential in the RFID, there are first fluctuation and second fluctuation. The first fluctuation is fluctuation of a power source potential, which arises from fluctuation of power supplied from a reader-writer depending on a location relation of the RFID and the reader-writer and a wireless signal. The second fluctuation is a power source noise generated in a circuit or the like included in the RFID. As the above structure, by categorization of the circuits into the first circuit and the second circuit, in the first regulator circuit that supplies power to the first circuit, the first function is used in order to suppress the first fluctuation and the second function is used in order to suppress a power source noise generated in the first circuit, that is, the second fluctuation.

Further, by categorization of the circuits into the first circuit and the second circuit, the first regulator circuit can be designed without consideration of the second function with respect to the second fluctuation generated in the second circuit. Therefore, it is easy to design the first regulator circuit.

Also, since the second circuit is not necessary to have stability of a power source potential as compared to the first circuit, the first fluctuation does not matter; therefore, the second regulator circuit may be provided or not.

Thus, although in the second regulator circuit, the first function is used to suppress the first fluctuation and the second function is used to suppress the second fluctuation caused in the second circuit, the design of the second regulator circuit is not necessarily as complicated as the first regulator circuit. That is, in the second regulator circuit, a size of the transistor and a layout area can be reduced as compared to the first regulator circuit. In addition, power consumption in the regulator circuit can be reduced.

By using the present invention, a semiconductor device such as an RFID or a wireless chip, which has a regulator circuit easy to be designed with a small layout area can be provided. Further, the semiconductor device can reduce an effect of a noise generated in the semiconductor device on circuit operation and can have high reliability.

BRIEF DESCRIPTION OF DRAWINGS

FIGS. 5A to 5D are partial cross-sectional views of a semiconductor device of the present invention.

FIGS. 6A to 6C are partial cross-sectional views of a semiconductor device of the present invention.

FIGS. 9A to 9C are partial cross-sectional views of a transistor included in a semiconductor device of the present invention.

FIGS. 16A to 16E are diagrams each showing an example of a product according to the present invention.

DETAILED DESCRIPTION OF THE INVENTION

Figure 1:
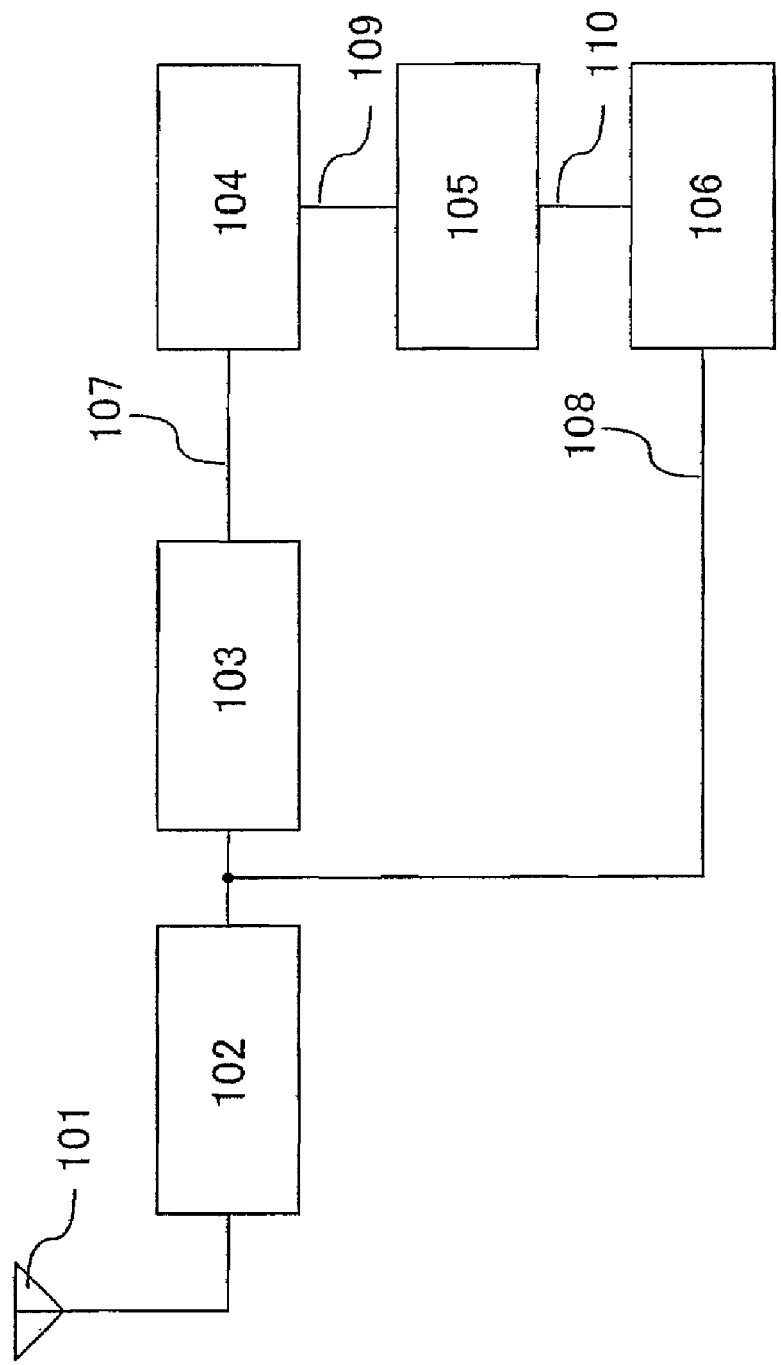
FIG. 1 is a diagram showing a semiconductor device of the present invention.

Although the invention will be fully described by way of embodiment modes with reference to the accompanying drawings, it is to be understood by those skilled in the art that various changes and modifications can be made without departing from the spirit and scope of the invention. Therefore, the present invention should not be construed as being limited to the description in the following embodiment modes. Note that common portions and portions having a similar function are denoted by the same reference numerals in all diagrams for describing embodiment modes, and description thereof is omitted.

Embodiment Mode 1

A structure of an RFID of the present invention is shown by a block diagram in FIG. 1.

The RFID shown in FIG. 1 includes an antenna 101, a rectifier circuit 102, a regulator circuit 103, a first circuit 104, a level shifter circuit 105, and a second circuit 106. The antenna 101 and the rectifier circuit 102 generate a power source potential needed for the first circuit 104 and the second circuit 106 from a radio wave or an electromagnetic wave, that is, a wireless signal (also referred to as a communication signal) from a reader-writer, which is received by the antenna 101. Actually, a signal is extracted from the antenna 101, the signal is processed by the second circuit 106, and a result of the process by the second circuit 106 is transmitted to the reader/writer from the antenna 101.

The first circuit 104 is a circuit that needs a given stable power source potential like a clock generating circuit, and the second circuit 106 is a circuit other than the circuit that needs a given stable power source potential, that is, a circuit other than the first circuit 104. The second circuit 106 is a logic circuit for interpreting, for example, a wireless signal to respond. For example, if a transistor included in the second circuit can be operated at approximately 1 to 10 V without damage, the power source potential of the second circuit may be approximately 1 to 10 V.

Figure 3:
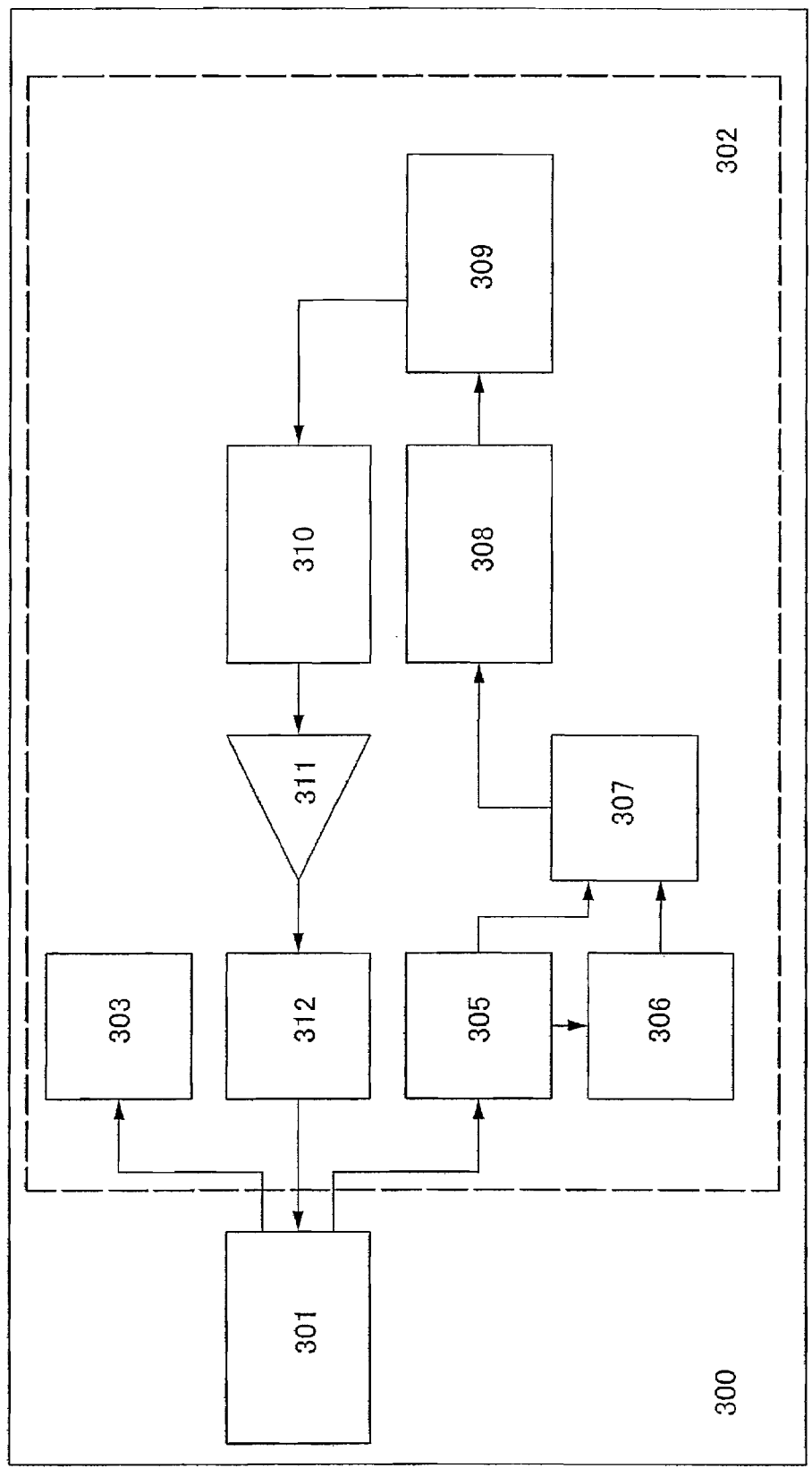
FIG. 3 is a diagram showing a semiconductor device of the present invention.

Next, operation of the RFID and a specific example of the first circuit 104 and the second circuit 106 are described with reference to FIG. 3. It is to be noted that the first circuit and the second circuit are not limited to this.

In an RFID 300, a communication signal received by an antenna circuit 301 is inputted to a demodulation circuit 305 in a signal processing circuit 302. Generally, the communication signal is transmitted by being subjected to a process such as ASK modulation or PSK modulation of a carrier wave of 13.56 MHz, 915 MHz, or the like. FIG. 3 shows an example in which a carrier wave of 915 MHz is employed as the communication signal. In FIG. 3, a standard clock signal is necessary for processing a signal, and thus a clock is generated from a communication signal here. A clock generating circuit 306 includes an oscillation circuit inside, and synchronizes an oscillation signal with a communication signal and then supplies the signal to a logic circuit 307 as a clock. Further, the modulated communication signal is demodulated by the demodulation circuit 305. The modulated signal is also transmitted to the logic circuit 307 to be analyzed. The signal analyzed by the logic circuit 307 is transmitted to a memory control circuit 308, and the memory control circuit 308 controls a memory circuit 309 to extract data stored in the memory circuit 309 and transmit the data to a logic circuit 310. The signal transmitted to the logic circuit 310 is subjected to an encoding process in the logic circuit 310 and subsequently amplified by an amplifier 311, and a modulation circuit 312 modulates a carrier wave by the signal. On the other hand, after a carrier wave made to enter into the rectifier circuit 303 is rectified, the carrier wave is supplied as a power source potential to the demodulation circuit 305, the clock generating circuit 306, the logic circuit 307, the memory control circuit 308, the memory circuit 309, the logic circuit 310, the amplifier 311, the modulation circuit 312, and the like in accordance with a structure of the power source of the present invention. In this manner, the RFID 300 is operated.

Note that the demodulation circuit 305, the logic circuit 307, the memory control circuit 308, the memory circuit 309, the logic circuit 310, the amplifier 311, the modulation circuit 312, and the like to which a power source potential generated from a communication signal is supplied are circuits for interpreting a wireless signal to respond, and thus each of them corresponds to a circuit other than the circuit that needs a given stable power source potential, that is, the second circuit. Note that the logic circuit is operated at approximately 1 V as the lowest power source potential to approximately 10 V as the highest power source potential as long as a transistor included in the circuit is not damaged, although it also depends on clock frequency and characteristics of the transistor.

On the other hand, clock frequency of the clock generating circuit 306 is changed by a power source potential supplied to the clock generating circuit 306; therefore, the clock generating circuit 306 which generates a clock needed for processing a signal corresponds to a circuit that needs a given stable power source potential, that is, the first circuit. As described above, in the first circuit, a stable power source potential generated from a communication signal received from the antenna circuit 301 through the rectifier circuit 303 and a regulator circuit is supplied to the clock generating circuit 306.

Note that the first circuit is not limited to the clock generating circuit. For example, in the case of detecting a potential of a sensor by an AD converter circuit, fluctuation of a power source potential of the AD converter circuit prevents accurate reading of a potential of the sensor; therefore, the AD converter circuit is a circuit that needs a given stable power source potential, that is, the first circuit. Thus, the first circuit refers to a circuit that needs a given stable power source potential.

The level shifter circuit 105 changes signal amplitude so that a signal outputted from the first circuit 104 can be received by the second circuit 106 and, conversely, changes signal amplitude so that a signal outputted from the second circuit 106 can be received by the first circuit 104, in the case where power source potentials inputted to the first circuit 104 and the second circuit 106 are different. The level shifter circuit 105 can be omitted in some cases depending on a difference between the power source potentials thereof.

Note that the level shifter circuit 105 is also referred to as a level converter circuit or a level conversion circuit. In the present invention, a dedicated circuit that is generally known may be used as the level shifter circuit 105. The level shifter circuit 105 can be formed of only an n-channel transistor and a resistor like an inverter of an NMOS circuit in some cases. It is needless to say that the level shifter circuit can be formed of a p-channel transistor and a resistor similarly. Depending on a difference between a power source potential of the first circuit 104 and a power source potential of the second circuit 106, the level shifter circuit 105 can be formed of an inverter circuit in view of balance between characteristics of an N type and a P type in the case of a CMOS circuit. That is, even an inverter circuit or a NAND circuit which forms a logic circuit included in the first circuit 104 or the second circuit 106 functions similarly to the level shifter circuit; therefore, a signal can be communicated between the first circuit 104 and the second circuit 106 without the use of a dedicated level shifter circuit.

Note that FIG. 1 shows that as for a line 107, a power source potential is supplied to the first circuit 104 from the rectifier circuit 102 through the regulator circuit 103, and as for a line 108, a power source potential is supplied to the second circuit 106 from the rectifier circuit 102. In addition, as for a line 109 and a line 110, a power source potential is supplied to the level shifter circuit 105 for changing signal amplitude and a signal communicated between the first circuit 104 and the second circuit 106. As power of the level shifter circuit 105, both or one of a power source potential similar to that supplied to the first circuit 104 and a power source potential similar to that supplied to the second circuit 106 can be used in accordance with a circuit configuration of the level shifter circuit 105. Therefore, the level shifter circuit 105 is included in both or one of the first circuit 104 and the second circuit 106. In FIG. 1, the first circuit 104 and the second circuit 106 are shown separately from the level shifter circuit 105 in order to emphasize that it is necessary to change signal amplitude.

Further, a power source potential outputted by the regulator circuit 103 is not used as power of the second circuit 106; therefore, in the design of an output side of the regulator circuit 103, it is not necessary to consider power consumed in the second circuit and a power source noise generated in the second circuit 106. It is not completely unnecessary to consider the second circuit 106 since the second circuit 106 affects an input side of the regulator circuit 103; however, the regulator circuit 103 can be designed further easily compared with a conventional case where a power source potential is supplied to the second circuit 106 as well through the regulator circuit 103.

Note that a plurality of the rectifier circuits 102 may be provided to separate an input terminal of the regulator circuit 103 and a power source terminal of the second circuit 106 so that each power source potential is set. Also, a plurality of antennas may be provided. With such a structure, power source potentials supplied to the first circuit 104 and the second circuit 106 may be generated individually with the use of different antennas and rectifier circuits.

Figure 4:
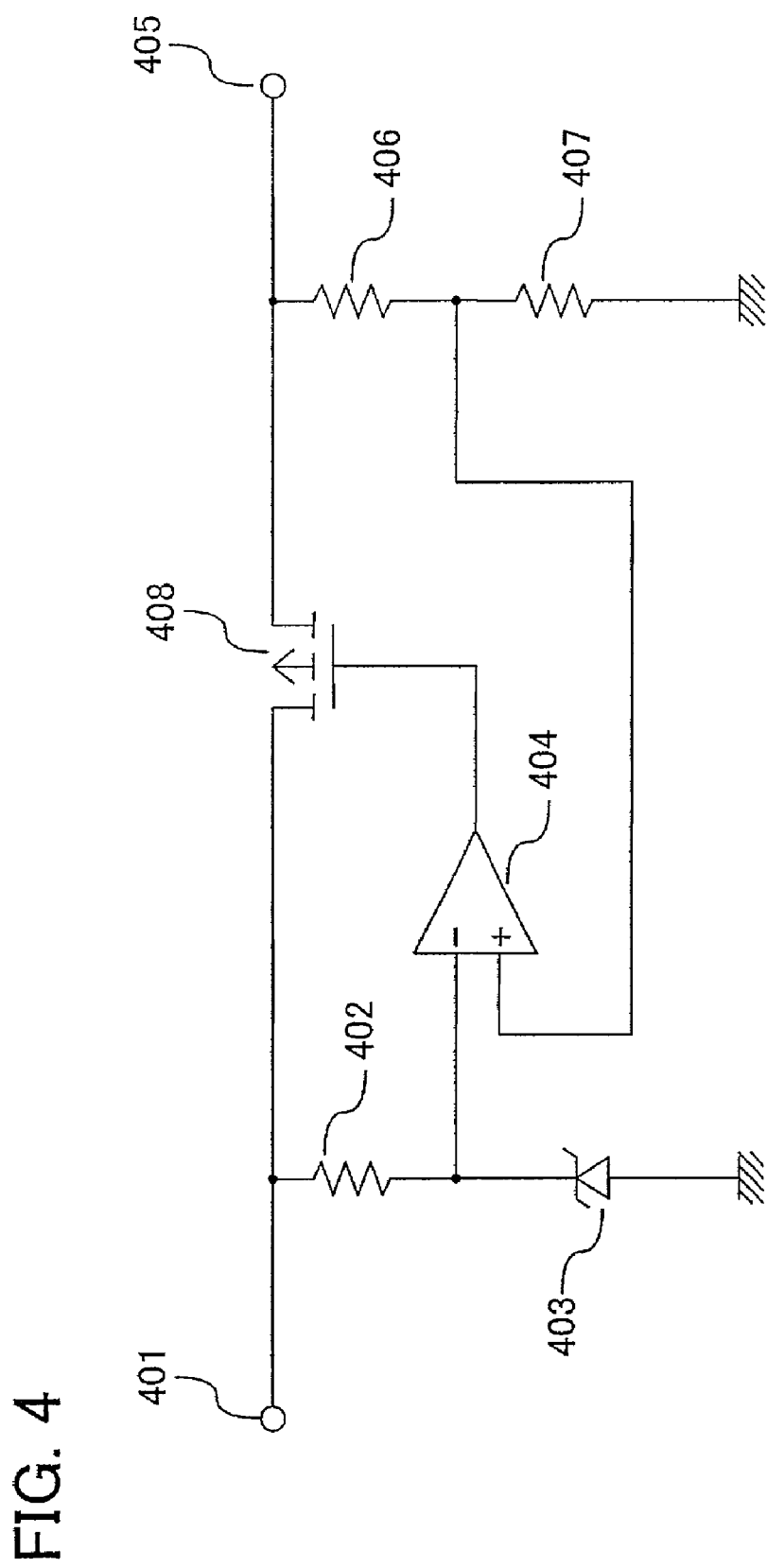
FIG. 4 is a diagram showing a configuration example of a regulator circuit.

Next, FIG. 4 shows a configuration example of the regulator circuit 103. The regulator circuit 103 shown in FIG. 4 includes a resistor 402, a zener diode 403, an operational amplifier 404, a resistor 406, a resistor 407, and a transistor 408. Note that the case where a p-channel transistor is used as the transistor 408 is described here.

A power source potential generated by the rectifier circuit 102 in FIG. 1 is supplied to a terminal 401 of the regulator circuit 103. The resistor 402 plays a role of a current source and the zener diode 403 generates a potential that is a standard. The obtained standard potential is inputted to an inverting input terminal of the operational amplifier 404. Note that in the case where the zener diode 403 is not used, a standard potential which does not depend on a power source potential may be generated by a circuit using a threshold voltage of the transistor 408, or the like. In addition, the terminal 405 is an output terminal of the regulator circuit, and an output potential is divided using the resistors 406 and 407 and then inputted to a non-inverting input terminal of the operational amplifier 404. An output terminal of the operational amplifier 404 is connected to a gate terminal of the p-channel transistor 408 and controls a current flowing from the terminal 401 to the terminal 405. Note that the transistor 408 may be an n-channel transistor and the inverting input terminal and the non-inverting input terminal of the operational amplifier 404 are inversely connected in that case.

In the regulator circuit 103, when current consumption of the circuit using the terminal 405 for a power source potential is increased and a potential of the terminal 405 is lowered, a potential of the non-inverting input terminal of the operational amplifier 404 lowers. When a potential of the non-inverting input terminal of the operational amplifier 404 is lowered, a potential of the output terminal of the operational amplifier 404 also lowers and a current flowing from the terminal 401 to the terminal 405 through the transistor 408 increases. Thus, the regulator circuit 103 is a feedback circuit in which when a potential of the terminal 405 is lowered, a current flowing from the terminal 401 to the terminal 405 is increased and the lowered potential of the terminal 405 is restored.

In the present invention, a power source potential obtained from the output terminal of the regulator circuit 103 is supplied to only the first circuit 104, so that current consumption of the circuit using a potential of the terminal 405 as a power source potential is low compared with the conventional case where the power source potential is supplied to the second circuit as well. Therefore, a current flowing from the terminal 401 to the terminal 405 through the transistor 408 can be reduced. Accordingly, the regulator circuit 103 can be designed easily. Note that heat generation of the transistor 408 can also be suppressed.

Further, in the present invention, a power source noise is not easily generated in the first circuit 104. That is, fewer circuits using the output terminal 405 of the regulator circuit are provided compared to the conventional structure. Therefore, it is not necessary to form a circuit in which a current applied from the terminal 401 to the terminal 405 can be increased instantaneously in order to suppress instantaneous fluctuation of power due to a power source noise. Even if fluctuation of power occurs, the amount of current applied instantaneously from the terminal 401 to the terminal 405 may be smaller than that of the conventional structure. Thus, it is not necessary that a circuit configuration of the regulator circuit 103 be complicated or a channel width of the transistor 408 be increased, and the regulator circuit 103 can be further reduced in size.

Note that in the present invention, the regulator circuit 103 is not limited to the one described above. A circuit configuration called a linear regulator, a series regulator, a shunt regulator, or a switching regulator, a circuit configuration that is generally known, or the like can be employed. Above all, a circuit configuration where a layout area is small and power consumption in the regulator circuit is low compared to those of the conventional regulator circuit configuration can be selected.

In the case of the clock generating circuit included in the first circuit 104 that needs a given stable power source potential, a clock performs larger number of logic inversions than other signals. The logic inversion means a change from a signal potential higher than a given threshold to a signal potential lower than a given threshold or, conversely, a change from a signal potential lower than a given threshold to a signal potential higher than a given threshold. In the case of using a CMOS circuit as the clock generating circuit, current consumption is increased at the time of change; therefore, the clock generating circuit consumes a larger amount of current than other logic circuits formed with the same number of elements in many cases. On the other hand, in the structure of FIG. 1, a power source potential outputted by the rectifier circuit 102 is generally higher than a power source potential obtained by inputting the output of the rectifier circuit 102 and then outputting it from the regulator circuit 103. That is, the clock generating circuit has higher operation frequency but has lower power source potential than other logic circuits. It is preferable that a power source potential of a whole circuit be lowered in order to reduce power consumption. However, in the case where a power source potential of the whole circuit cannot be lowered, a power source potential of part of the circuit is lowered so that power consumption is reduced as much as possible. When lowering a power source potential of part of the circuit, in the case of the circuit formed of the same numbers of elements, it is efficient to lower a power source potential of part of the circuit, which has high operation frequency. Therefore, in the structure of FIG. 1 of the present invention, it is efficient that the clock generating circuit is included in the first circuit so that power consumption is reduced.

Note that an object of the present invention is not to differentiate power source potentials unlike a case of using a multiple power source circuit for lowering power consumption and multiple power sources using a booster circuit for a certain circuit. Instead, if there is no difference between a power source potential of the first circuit 104 and a power source potential of the second circuit 106, it is not necessary to provide a level shifter circuit for a signal communicated between the first circuit 104 and the second circuit 106 as described above; therefore, there are effects such as no power consumption, no layout area, and no signal delay in the level shifter circuit 105, which is preferable.

Thus, a load of the first regulator circuit 103 which supplies power to only the first circuit 104 is smaller than a load of the conventional regulator circuit which supplies a power source potential to both of the first circuit 104 and the second circuit 106. In the case where the load of the first regulator circuit 103 is small, it is easy to design the regulator circuit 103. Further, since power to be changed for suppressing fluctuation of a potential of an output may be low, a layout area can be reduced by reduction in the size of a transistor or change of a circuit configuration. Further, the power source noise generated in the second circuit 106 does not easily affect a power source potential of the first circuit 104. The conventional circuit configuration has a possibility that a power source noise generated in a circuit corresponding to the second circuit 106 may lower a power source potential of a circuit corresponding to the first circuit 104, and thus circuit operation may be adversely affected because circuits corresponding to the first circuit 104 and the second circuit 106 share a common power source. Also in the present invention, it is difficult to say that there is no possibility that circuit operation is adversely affected when a power source noise is generated in the first circuit 104; however, only the first circuit is necessarily designed carefully and the regulator circuit which supplies a power source potential of the first circuit can be designed such that the smaller the load is, the less easily a power source noise occur in the first circuit. In addition, power consumption in the regulator circuit can be reduced.

Conversely, it is possible to further stabilize an output potential of the regulator circuit retaining a layout area and power consumption in the regulator circuit.

Further, a power source potential generated in the rectifier circuit 102 is used as it is for the second circuit 106 without the use of a regulator circuit, so that a layout area supposed to be occupied by the regulator circuit or power supposed to be consumed in the regulator circuit can be reduced.

Thus, a semiconductor device includes a regulator circuit having a small layout area, which can be designed easily, can be provided.

Embodiment Mode 2

In this embodiment mode, a structure of another mode than Embodiment Mode 1 is described with reference to FIG. 2. Note that the RFID shown in FIG. 2 has a structure in which the regulator circuit 201 is added to the structure of the RFID shown in FIG. 1 and includes the antenna 101, the rectifier circuit 102, the regulator circuit 103, the first circuit 104, the level shifter circuit 105, the second circuit 106, and the regulator circuit 201. Note that similar portions to those in FIG. 1 are denoted by the same reference numerals in FIG. 2, and description thereof is omitted. In addition, in order to distinguish the regulator circuit 103 and the regulator circuit 201, they are respectively referred to as a first regulator circuit and a second regulator circuit.

Figure 2:
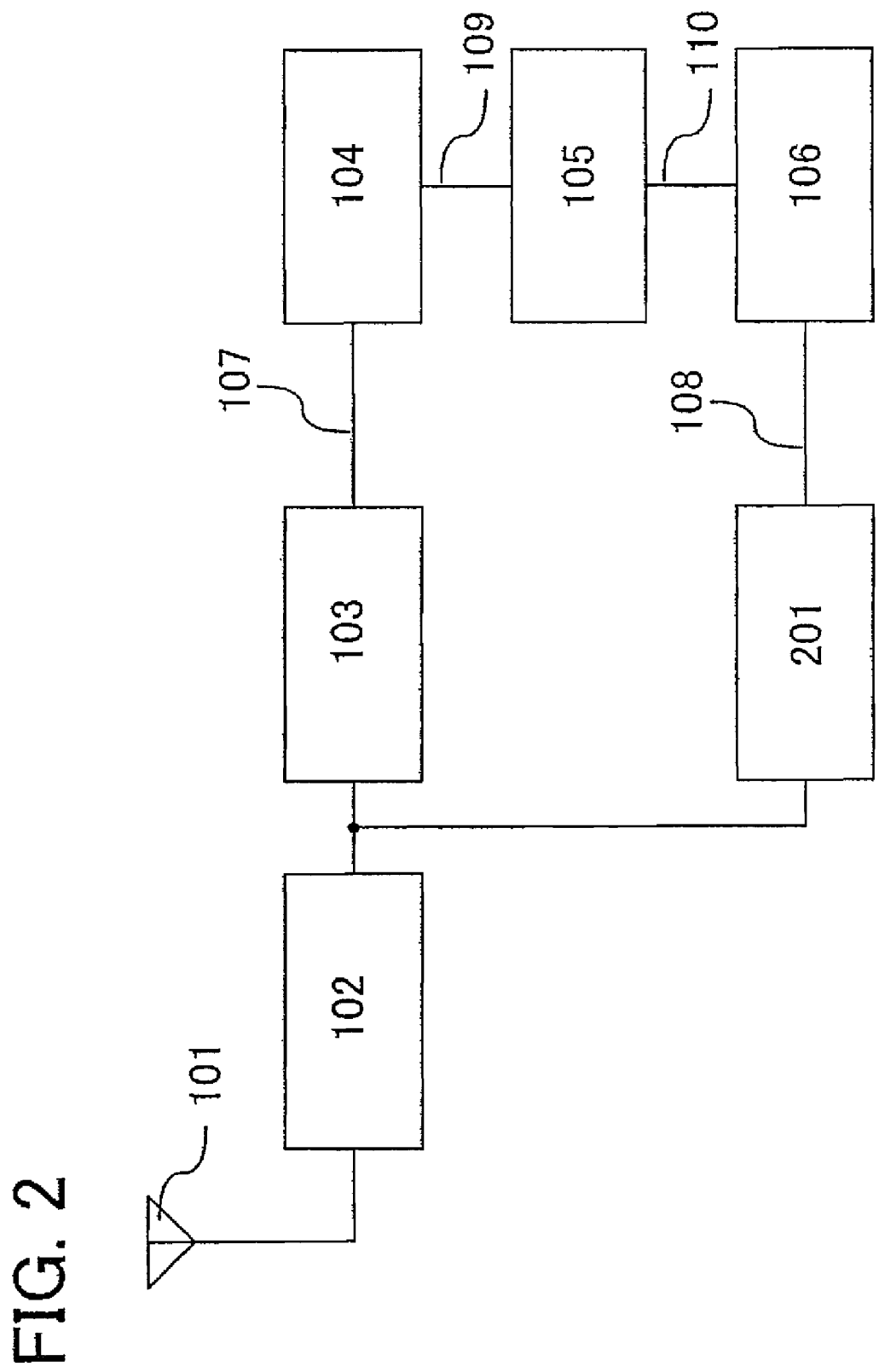
FIG. 2 is a diagram showing a semiconductor device of the present invention.

In FIG. 2, the regulator circuit 201 prevents a power source potential of the second circuit 106 from being too high. A state where a power source potential of the second circuit 106 is too high corresponds to a state where a voltage that damages the transistor included in the second circuit 106 is applied or a state where the difference between a power source potential of the first circuit 104 and a power source potential of the second circuit 106 is increased to the extent that signal amplitude cannot be changed by the level shifter circuit 105. Thus, by addition of the second regulator circuit 201, the RFID having higher reliability can be obtained.

Although an output potential of the second regulator circuit 201 is preferably determined, a target output potential of the regulator circuit 201 is not necessary to be determined unlike an output potential of the first regulator circuit 103. Therefore, the second regulator circuit 201 may be a circuit aiming at supplying a power source potential same as that of the first regulator circuit 103 or a circuit supplying a different power source potential. Thus, the second regulator circuit 201 does not need a function comparable to that of the first regulator circuit 103. For example, in the case where an oscillation circuit is included in the first circuit 104, oscillation frequency of the oscillation circuit depends on a power source potential, and a power of 2 V±0.2 V is necessary for oscillation at 10 MHz±1 MHz, an output potential of the first regulator circuit 103 has to be 2 V±0.2 V in order to obtain oscillation at 10 MHz±1 MHz. On the other hand, in the case where fluctuation of an output potential of the second regulator circuit 201 may be within ±10%, it is not limited to 2 V±0.2 V and it may be 3 V±0.3 V or 4 V±0.4 V instead. In addition, when fluctuation of a power source potential outputted by the first regulator circuit 103 is within, for example, 5%, fluctuation of a power source potential outputted by the second regulator circuit 201 may be within 10% and is not necessary to have stability comparable to that of the first regulator circuit 103. Therefore, the second regulator circuit 201 can be manufactured with a small layout area and an easy design by reduction in size of the transistor included in the regulator circuit as compared to the first regulator circuit 103.

In addition, power consumption in the regulator circuit is low.

There is variation in devices in the manufacturing process, and for example, there is the case where the first regulator circuit 103 is added with a complicated correction circuit or is laid out so that a correction such as cutting of a wiring with laser in accordance with characteristics of a device is performed in a subsequent step in order to set an output voltage of the first regulator circuit 103 to a given stable value. However, the second regulator circuit 201 does not need such a complicated correction circuit or such a layout for cutting. Thus, in the case where a power source potential generated in the second regulator circuit 201 is used for the second circuit 106, the second regulator circuit 201 does not need a function comparable to that of the first regulator circuit 103. Therefore, the second regulator circuit 201 can be reduced in a layout area and power consumption in the regulator circuit, thereby being designed easily.

Accordingly, a semiconductor device including the regulator circuit with a small layout area and an easy design can be provided.

Note that the second regulator circuit 201 may be substituted by a voltage limiter circuit. The voltage limiter circuit is a circuit which controls a power source potential by change of a current flowing from a power source to the ground when the power source potential is more than a given value. For example, a Schottky-barrier diode, a PIN diode, a PN diode, or a diode-connected transistor, or the like can be used.

This embodiment mode can be implemented in combination with any of the other embodiment modes in this specification as appropriate.

Embodiment Mode 3

In this embodiment mode, an example of a method for manufacturing the semiconductor device such as an RFID described in the aforementioned embodiment mode is described with reference to partial cross-sectional views.

First, as shown in FIG. 5A, a release layer 503 is formed over one side of the substrate 501 with an insulating film 502 interposed therebetween. Subsequently, an insulating film 504 that function as base film and a semiconductor film 505 (for example, a film containing amolphous silicon) are stacked. Note that the insulating film 502, the release layer 503, the insulating film 504, and the semiconductor film 505 can be sequentially formed.

As the substrate 501, a glass substrate, a quartz substrate, a metal substrate (such as a stainless steel substrate), a ceramic substrate, or a semiconductor substrate such as a silicon substrate can be used. Alternatively, a substrate formed of polyethylene terephthalate (PET), polyethylene naphthalate (PNT), polyether sulfone (PES), acrylic, or the like can be used as a plastic substrate. Note that in this step, the release layer 503 is provided all over the substrate 501 with the insulating film 502 interposed therebetween; however, the release layer 503 may be selectively provided by a photolithography method if required after provision of the release layer all over the substrate 501.

The insulating films 502 and 504 are each formed of an insulating material such as silicon oxide, silicon nitride, silicon oxynitride ($SiO_xN_y$) (x>y>0), or silicon nitride oxide ($SiN_xO_y$) (x>y>0), by a CVD method, a sputtering method, or the like. For example, in a case where the insulating films 502 and 504 each have a two-layer structure, a silicon nitride oxide film may be formed as a first insulating film and a silicon oxynitride film may be formed as a second insulating film. Alternatively, a silicon nitride film may be formed as the first insulating film and a silicon oxide film may be formed as the second insulating film. The insulating film 502 functions as a blocking layer for preventing an impurity element in the substrate 501 from being mixed into the release layer 503 or an element fowled thereover. The insulating film 504 functions as a blocking layer for preventing an impurity element in the substrate 501 and the release layer 503 from being mixed into an element formed over the substrate 501 and the release layer 503. By forming the insulating films 502 and 504 each functioning as a blocking layer in this manner, it is possible to prevent alkaline metal or alkali earth metal such as Na in the substrate 501 and an impurity element included in the release layer 503 from adversely affecting an element to be formed over the substrate 501 and the release layer 503. In a case of using quartz for the substrate 501, the insulating films 502 and 504 may be omitted.

As the release layer 503, a metal film, a stacked layer structure of a metal film and a metal oxide film, or the like can be used. The metal film is formed as a single layer or stacked layers of a film formed of an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), and iridium (Ir), or an alloy material or a compound material including the above-described element as its main component. The metal film can be formed by a sputtering method, various CVD methods such as a plasma CVD method, or the like. As the stacked layer structure of a metal film and a metal oxide film, after the above-described metal film is formed, an oxide or oxynitride of the metal film can be formed on the metal film surface by performing plasma treatment in an oxygen atmosphere or an $N_2O$ atmosphere, or heat treatment in an oxygen atmosphere or an $N_2O$ atmosphere. For example, in a case where a tungsten film is formed by a sputtering method, a CVD method, or the like as the metal film, a metal oxide film of tungsten oxide can be formed on the tungsten film surface by performing plasma treatment on the tungsten film. In this case, an oxide of tungsten is expressed by $WO_x$, and x is 2 to 3. There are cases of x=2 ($WO_2$), x=2.5 ($W_2O_5$), x=2.75 ($W_4O_{11}$), x=3 ($WO_3$), and the like. When framing an oxide of tungsten, the value of x described above is not particularly restricted, and which oxide is to be formed may be decided based on an etching rate or the like. Alternatively, for example, a metal film (such as tungsten) is formed and then an insulating film of silicon oxide ($SiO_2$) or the like is formed over the metal film by a sputtering method, and a metal oxide may be formed over the metal film (for example, tungsten oxide over tungsten). Further, as plasma treatment, the above-described high-density plasma treatment may be performed, for example. Instead of the metal oxide film, a metal nitride or a metal oxynitride may be used. In this case, the metal film may be subjected to the plasma treatment or the heat treatment in a nitrogen atmosphere or an atmosphere of nitrogen and oxygen.

The semiconductor film 505 is formed to a thickness of 25 to 200 nm (preferably, 30 to 150 nm) by a sputtering method, an LPCVD method, a plasma CVD method, or the like.

Next, the semiconductor film 505 is crystallized by irradiation with laser light. Note that the semiconductor film 505 may be crystallized by a method in which irradiation with laser light is combined with a thermal crystallization method using an RTA or an annealing furnace, or a thermal crystallization method using a metal element for promoting crystallization, or the like. After that, as shown in FIG. 5B, the obtained semiconductor film is etched so as to have a desired shape, thereby forming crystalline semiconductor films 505a to 505f. Then, a gate insulating film 506 is formed so as to cover the semiconductor films 505a to 505f.

Note that the insulating film 506 is formed of an insulating material such as silicon oxide, silicon nitride, silicon oxynitride ($SiO_xN_y$) (x>y>0), or silicon nitride oxide ($SiN_xO_y$) (x>y>0), by a CVD method, a sputtering method, or the like. For example, in the case where the gate insulating film 506 has a two-layer structure, a silicon oxynitride film may be formed as a first insulating film and a silicon nitride oxide film may be formed as a second insulating film. Alternatively, a silicon oxide film may be formed as the first insulating film and a silicon nitride film may be formed as the second insulating film.

An example of a manufacturing step of the semiconductor films 505a to 505f is briefly described below. First, an amorphous semiconductor film with a thickness of 50 to 60 nm is formed by a plasma CVD method. Next, a solution containing nickel that is a metal element for promoting crystallization is retained on the amorphous semiconductor film, and dehydrogenation treatment (at 500° C., for one hour) and thermal crystallization treatment (at 550° C., for four hours) are performed to the amorphous semiconductor film, thereby fanning a crystalline semiconductor film. After that, the crystalline semiconductor film is irradiated with laser light, and a photolithography method is used, so that the crystalline semiconductor films 505a to 505f are formed. Note that without being subjected to the thermal crystallization which uses the metal element for promoting crystallization, the amorphous semiconductor film may be crystallized only by irradiation with laser light.

As a laser oscillator used for crystallization, a continuous wave laser beam (a CW laser beam) or a pulsed wave laser beam (a pulsed laser beam) can be used. As a laser beam which can be used here, a laser beam emitted from one or more of the following can be used: a gas laser such as an Ar laser, a Kr laser, or an excimer laser; a laser of which medium is single crystalline YAG, $YVO_4$, forsterite ($Mg_2SiO_4$), $YAlO_3$, or $GdVO_4$, or polycrystalline (ceramic) YAG; $Y_2O_3$, $YVO_4$, $YAlO_3$, or $GdVO_4$, added with one or more of Nd, Yb, Cr, Ti, Ho, Er, Tm, and Ta as a dopant; a glass laser; a ruby laser; an alexandrite laser; a Ti:sapphire laser; a copper vapor laser; or a gold vapor laser. It is possible to obtain crystals with a large grain size when fundamental waves of such laser beams or second to fourth harmonics of the fundamental waves are used. For example, the second harmonic (532 nm) or the third harmonic (355 nm) of an Nd:$YVO_4$ laser (fundamental wave of 1064 nm) can be used. In this case, an power density of approximately 0.01 to 100 $MW/cm^2$ (preferably, 0.1 to 10 $MW/cm^2$) is required. Irradiation is conducted at a scanning rate of approximately 10 to 2000 cm/sec (preferably 10 to 200 cm/sec). It is to be noted that, a laser using, as a medium, single crystalline YAG, $YVO_4$, forsterite ($Mg_2SiO_4$), $YAlO_3$, or $GdVO_4$, or polycrystalline (ceramic) YAG; $Y_2O_3$, $YVO_4$, $YAlO_3$, or $GdVO_4$ added with one or more of Nd, Yb, Cr, Ti, Ho, Er, Tm, and Ta as a dopant; an Ar ion laser; or a Ti:sapphire laser can be continuously oscillated. Furthermore, pulse oscillation thereof can be performed at a repetition rate of 10 MHz or more by carrying out Q switch operation, mode locking, or the like. In a case where a laser beam is oscillated at a repetition rate of 10 MHz or more, after a semiconductor film is melted by a laser and before it is solidified, the semiconductor film is irradiated with a next pulse. Therefore, unlike a case of using a pulsed laser with a low repetition rate, a solid-liquid interface can be continuously moved in the semiconductor film, so that crystal grains which continuously grow in a scanning direction can be obtained.

Alternatively, the gate insulating film 506 may be formed by performing the above-described high-density plasma treatment to the crystalline semiconductor films 505a to 505f to oxidize or nitride the surfaces. For example, the gate insulating film 506 is formed by plasma treatment introducing a mixed gas of a rare gas such as He, Ar, Kr, or Xe and oxygen, nitrogen oxide ($NO_2$), ammonia, nitrogen, hydrogen, or the like. When excitation of the plasma in this case is performed by introduction of a microwave, plasma with a low electron temperature and high density can be generated. By an oxygen radical (there is the case where an OH radical is included) or a nitrogen radical (there is the case where an NH radical is included) generated by this high-density plasma, the surfaces of the semiconductor films can be oxidized or nitrided.

By treatment using such high-density plasma, an insulating film with a thickness of 1 to 20 nm, typically 5 to 10 nm, is formed over the semiconductor film. Since the reaction of this case is a solid-phase reaction, interface state density between the insulating film and the semiconductor film can be extremely low. Since such high-density plasma treatment oxidizes (or nitrides) a semiconductor film (crystalline silicon, or polycrystalline silicon) directly, unevenness of a thickness of the insulating film to be formed can be extremely small, ideally. In addition, oxidation is not strengthened even in a crystal grain boundary of crystalline silicon, which makes a very preferable condition. That is, by a solid-phase oxidation of the surface of the semiconductor film by the high-density plasma treatment shown here, an insulating film with good uniformity and low interface state density can be formed without abnormal oxidation reaction in a crystal grain boundary.

As the gate insulating film 506, an insulating film formed by the high-density plasma treatment may be used by itself, or an insulating film of silicon oxide, silicon oxynitride, silicon nitride, or the like may be formed thereover by a CVD method using plasma or thermal reaction, so as to make stacked layers. In any case, a transistor including an insulating film formed by high-density plasma, in a part of the gate insulating film or in the whole gate insulating film, can reduce variation in the characteristics.

Furthermore, a semiconductor film is irradiated with a continuous wave laser beam or a laser beam oscillated at a repetition rate of 10 MHz or more and is scanned in one direction for crystallization, so that each of the semiconductor films 505a to 505f which has a characteristic that the crystal grows in the scanning direction of the beam is obtained. When a transistor is provided so that the scanning direction is aligned with the channel length direction (a direction in which carriers flow when a channel formation region is formed) and the above-described gate insulating layer is used, a thin film transistor (TFT) with less characteristic variation and high field effect mobility can be obtained.

Next, a first conductive film and a second conductive film are stacked over the gate insulating film 506. Here, the first conductive film is formed with a thickness of 20 to 100 nm by a CVD method, a sputtering method, or the like, and the second conductive film is formed with a thickness of 100 to 400 nm. The first conductive film and the second conductive film are formed using an element selected from tantalum (Ta), tungsten (W), titanium (Ti), molybdenum (Mo), aluminum (Al), copper (Cu), chromium (Cr), niobium (Nb), and the like, or an alloy material or a compound material including the above-described element as its main component. Alternatively, they are formed using a semiconductor material typified by polycrystalline silicon doped with an impurity element such as phosphorus. As examples of a combination of the first conductive film and the second conductive film, a tantalum nitride film and a tungsten film, a tungsten nitride film and a tungsten film, a molybdenum nitride film and a molybdenum film, and the like can be given. Since tungsten and tantalum nitride have high heat resistance, heat treatment for thermal activation can be performed after the first conductive film and the second conductive film are formed. In addition, in a case of a three-layer structure instead of a two-layer structure, a stacked layer structure of a molybdenum film, an aluminum film, and a molybdenum film is preferably adopted.

Next, a resist mask is formed by a photolithography method, and etching treatment for forming a gate electrode and a gate line is performed, so that gate electrodes 507 are formed above the semiconductor films 505a to 505f. Here, an example in which the gate electrode 507 has a stacked layer structure of a first conductive film 507a and a second conductive film 507b is shown.

Next, as shown in FIG. 5C, with the use of the gate electrode 507 as a mask, an impurity element imparting n-type conductivity is added to the semiconductor films 505a to 505f at low concentration by an ion doping method or an ion implantation method, and then, a resist mask is selectively formed by a photolithography method and an impurity element imparting p-type conductivity is added at high concentration. As an impurity element imparting n-type conductivity, phosphorus (P), arsenic (As), or the like can be used. As an impurity element imparting p-type conductivity, boron (B), aluminum (Al), gallium (Ga), or the like can be used. Here, phosphorus (P) is used for the impurity element imparting n-type conductivity, and is selectively introduced into the semiconductor films 505a to 505f at a concentration of $1\times10^{15}$ to $1\times10^{19}/cm^3$, so that an n-type impurity region 508 is formed. Further, boron (B) is used for the impurity element imparting p-type conductivity, and is selectively introduced into the semiconductor films 505c and 505e at a concentration of $1\times10^{19}$ to $1\times10^{20}/cm^3$, so that a p-type impurity region 509 is formed.

Next, an insulating film is formed so as to cover the gate insulating film 506 and the gate electrodes 507. The insulating film is formed as a single layer or stacked layers of a film including an inorganic material such as silicon, an oxide of silicon, or a nitride of silicon, or an organic material such as an organic resin, by a plasma CVD method, a sputtering method, or the like. Next, the insulating film is selectively etched by anisotropic etching which mainly etches in a perpendicular direction, so that insulating films 510 (also referred to as side walls) which are in contact with side surfaces of the gate electrodes 507 are formed. The insulating films 510 are used as masks for doping when LDD (Lightly Doped Drain) regions are formed.

Next, with the use of a resist mask formed by a photolithography method, the gate electrodes 507, and the insulating films 510 as masks, an impurity element imparting n-type conductivity is added to the semiconductor films 505a, 505b, 505d, and 505f at high concentration, so that n-type impurity regions 511 are formed. Here, phosphorus (P) is used for the impurity element imparting n-type conductivity, and is selectively introduced into the semiconductor films 505a, 505b, 505d, and 505f at a concentration of $1\times10^{19}$ to $1\times10^{20}/cm^3$, so that the n-type impurity regions 511 with higher concentration than the n-type impurity regions 508 are formed.

Through aforementioned steps, as shown in FIG. 5D, n-channel thin film transistors 500a, 500b, 500d, and 500f, and p-channel thin film transistors 500c and 500e are formed. Note that the thin film transistors 500a to 500f are included in the semiconductor device of the present invention, such as an RFID.

Note that in the n-channel thin film transistor 500a, a channel formation region is formed in a region of a semiconductor film 505a, which is overlapped with the gate electrode 507; the impurity region 511 forming a source region or a drain region is formed in a region which is not overlapped with the gate electrode 507 and the insulating film 510; and a lightly doped drain region (LDD region) is formed in a region which is overlapped with the insulating film 510 and is between the channel formation region and the impurity region 511. Similarly, in the n-channel thin film transistors 500b, 500d, and 500f, a channel formation region, a lightly doped drain region, and the impurity region 511 are formed.

In the p-channel thin film transistor 500c, a channel formation region is formed in a region of a semiconductor film 505c, which is overlapped with the gate electrode 507, and the impurity region 509 forming a source region or a drain region is formed in a region which is not overlapped with the gate electrode 507. Similarly, in the p-channel thin film transistor 500e, a channel formation region and an impurity region 509 are formed. Note that although each of the p-channel thin film transistors 500c and 500e is not provided with an LDD region here, a structure may be employed, in which each of the p-channel thin film transistors is provided with an LDD region or each of the n-channel thin film transistors is not provided with an LDD region.

Next, as shown in FIG. 6A, an insulating film is formed as a single layer or stacked layers so as to cover the semiconductor films 505a to 505f, the gate electrodes 507, and the like; thereby forming conductive films 513 over the insulating film, which is electrically connected to the impurity regions 509 and 511 for forming source regions or drain regions of the thin film transistors 500a to 500f. The insulating film is formed as a single layer or stacked layers using an inorganic material such as an oxide of silicon or a nitride of silicon, an organic material such as polyimide, polyamide, benzocyclobutene, acrylic, or epoxy, a siloxane material, or the like, by a CVD method, a sputtering method, an SOG method, a droplet discharge method, a screen printing method, or the like, Here, the insulating film is fowled to have a two-layer structure. A silicon nitride oxide film is fowled as a first insulating film 512a, and a silicon oxynitride film is formed as a second insulating film 512b. The conductive films 513 form the source electrodes or the drain electrodes of the thin film transistors 500a to 500f.

It is to be noted that before the insulating films 512a and 512b are formed or after one or more of thin films of the insulating films 512a and 512b are formed, heat treatment for recovering the crystallinity of the semiconductor film, for activating the impurity element which has been added to the semiconductor film, or for hydrogenating the semiconductor film is preferably performed. For the heat treatment, thermal annealing, a laser annealing method, an RTA method, or the like is preferably adopted.

The conductive film 513 is formed as a single layer or stacked layers using an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing the above-described element as its main component, by a CVD method, a sputtering method, or the like. An alloy material containing aluminum as its main component corresponds to a material which contains aluminum as its main component and also contains nickel, or an alloy material which contains aluminum as its main component and also contains nickel and one or both of carbon and silicon, for example. The conductive film 513 preferably employs, for example, a stacked layer structure of a barrier film, an aluminum-silicon (Al—Si) film, and a barrier film, or a stacked layer structure of a barrier film, an aluminum-silicon (Al—Si) film, a titanium nitride (TiN) film, and a barrier film. It is to be noted that a barrier film corresponds to a thin film formed by using titanium, a nitride of titanium, molybdenum, or a nitride of molybdenum. Aluminum and aluminum silicon which have low resistance and are inexpensive are optimal materials for forming the conductive film 513. In addition, generation of a hillock of aluminum or aluminum silicon can be prevented when upper and lower barrier layers are formed. Furthermore, when the barrier film is formed by using titanium that is a highly-reducible element, even if a thin natural oxide film is formed over the semiconductor film, the natural oxide film can be reduced so that preferable contact with the semiconductor film can be obtained.

Next, an insulating film 514 is formed so as to cover the conductive films 513, and a conductive film 515 is formed over the insulating film 514 to be electrically connected to the conductive film 513 which forms a source electrode or a drain electrode of the thin film transistor. Note that FIG. 6B shows the conductive film 515 electrically connected to the conductive film 513 which forms a source electrode or a drain electrode of the thin film transistor 500a. Furthermore, the conductive film 515 can be formed using any of the materials given for the conductive films 513.

Subsequently, as shown in FIG. 6B, a conductive film 516 functioning as an antenna is formed so as to be electrically connected to the conductive film 515.

The insulating film 514 can be formed by a CVD method, a sputtering method, or the like to have a single layer structure or a stacked layer structure of an insulating film containing oxygen or nitrogen, such as a silicon oxide ($SiO_x$) film, a silicon nitride ($SiN_x$) film, a silicon oxynitride ($SiO_xN_y$) (x>y) film, and a silicon nitride oxide ($SiN_xO_y$) (x>y) film; a film containing carbon such as DLC (Diamond Like Carbon); or a film made of an organic material such as epoxy, polyimide, polyamide, polyvinylphenol, benzocyclobutene, or acrylic, a siloxane material such as a siloxane resin. The siloxane material is a material including a Si—O—Si bond. Siloxane is composed of a skeleton formed by the bond of silicon (Si) and oxygen (O), in which an organic group containing at least hydrogen (such as an alkyl group or an aryl group) is contained as a substituent. Alternatively, a fluoro group may be used as the substituent. Further alternatively, a fluoro group and an organic group containing at least hydrogen may be used as the substituent.

The conductive films 516 are formed using a conductive material by a CVD method, a sputtering method, a printing method such as screen printing or gravure printing, a droplet discharge method, a dispenser method, a plating method, or the like. The conductive material is formed as a single layer or stacked layers using an element selected from aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material including the above-described element as its main component.

For example, in a case of forming the conductive films 516 functioning as the antennas by a screen printing method, the conductive films can be formed by being selectively printed with conductive paste in which conductive particles each having a grain size of several nm to several tens of μm are dissolved or dispersed in an organic resin. As the conductive particle, a fine particle or a dispersive nanoparticle of one or more metals of silver (Ag), gold (Au), copper (Cu), nickel (Ni), platinum (Pt), palladium (Pd), tantalum (Ta), molybdenum (Mo), and titanium (Ti) or silver halide can be used. In addition, as the organic resin included in the conductive paste, one or a plurality of organic resins each functioning as a binder, a solvent, a dispersant, or a coating of the metal particle can be used. Typically, an organic resin such as an epoxy resin or a silicon resin can be used. When forming a conductive film, baking is preferably performed after the conductive paste is applied. For example, in a case of using fine particles (of which grain size is 1 to 100 nm) containing silver as its main component as a material of the conductive paste, the conductive paste is hardened by being baked at a temperature of 150 to 300° C., and thus a conductive film can be obtained. Alternatively, fine particles containing solder or lead-free solder as its main component may be used; in this case, it is preferable to use a fine particle having a grain size of 20 μm or less. Solder and lead-free solder have an advantage such as low cost.

Next, as shown in FIG. 6C, after an insulating film 517 is formed so as to cover the conductive film 516, a layer including the thin film transistors 500a to 500f, the conductive films 516, and the like (hereinafter referred to as an "element formation layer 518") is peeled from the substrate 501. Here, opening portions are formed by laser light (such as UV light) irradiation in a region except portions in which the thin film transistors 500a to 500f are formed, and then, the element formation layer 518 can be peeled from the substrate 501 by using physical force. Alternatively, an etchant may be introduced into the opening portions before the element formation layer 518 is peeled from the substrate 501; thereby selectively removing the release layer 503. As the etchant, gas or a liquid containing halogen fluoride or an interhalogen compound is used. For example, chlorine trifluoride ($ClF_3$) is used as gas containing halogen fluoride. Accordingly, the element formation layer 518 is peeled from the substrate 501. Note that the release layer 503 may be partially left instead of being removed entirely. Thus, consumption of the etchant can be reduced and process time for removing the release layer can be shortened. In addition, the element formation layer 518 can be retained over the substrate 501 even after the release layer 503 is removed. In addition, the substrate 501 is reused after the element formation layer 518 is peeled off, thereby reducing the cost.

The insulating film 517 can be formed by a CVD method, a sputtering method, or the like to have a single layer structure or a stacked layer structure of an insulating film containing oxygen or nitrogen, such as a silicon oxide ($SiO_x$) film, a silicon nitride ($SiN_x$) film, a silicon oxynitride ($SiO_xN_y$, x>y) film, or a silicon nitride oxide ($SiN_xO_y$, x>y) film; a film containing carbon such as DLC (Diamond Like Carbon); or a film made of an organic material such as epoxy, polyimide, polyamide, polyvinylphenol, benzocyclobutene, or acrylic; and a siloxane material such as a siloxane resin.

Figure 7A:
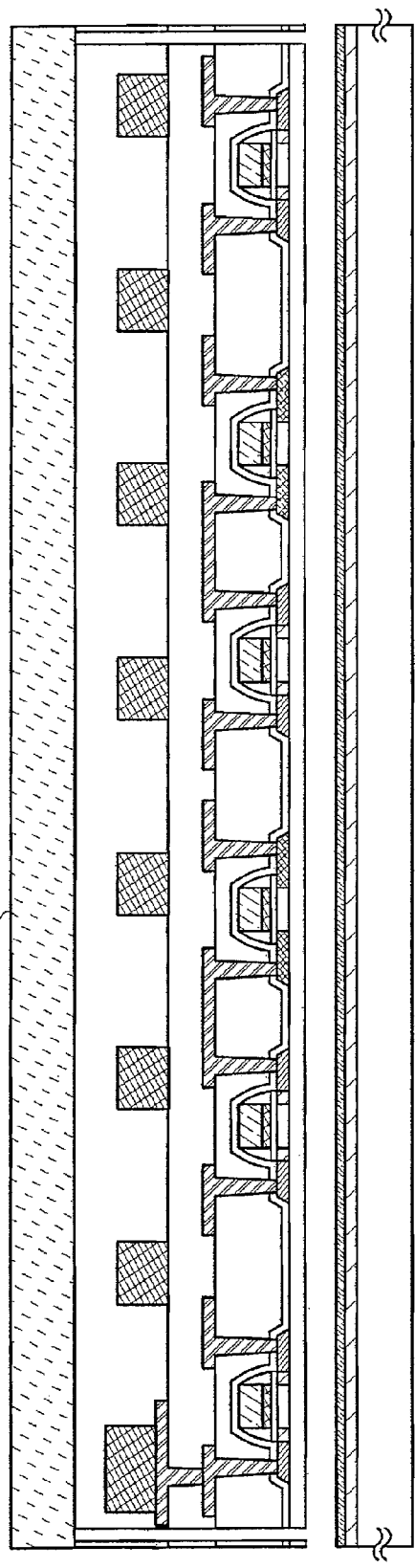
FIGS. 7A and 7B are partial cross-sectional views of a semiconductor device of the present invention.

In this embodiment mode, as shown in FIG. 7A, after an opening portion is formed in the element formation layer 518 by laser light irradiation, a first sheet material 519 is attached to one surface of the element formation layer 518 (a surface of the insulating film 517 that is exposed). Then, the element formation layer 518 is peeled from the substrate 501.

Figure 7B:
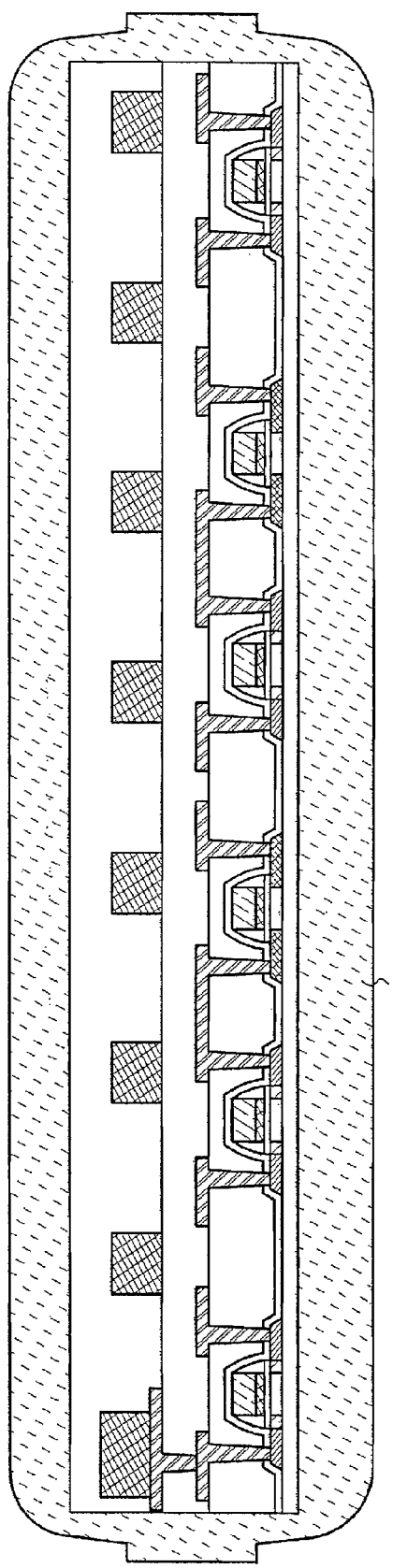

Next, as shown in FIG. 7B, a second sheet material 520 is attached to the other surface of the element formation layer 518 (a surface exposed by peeling) by one or both of heat treatment and pressure treatment. As the first sheet material 519 and the second sheet material 520, a hot-melt film or the like can be used.

As the first sheet material 519 and the second sheet material 520, a film on which an antistatic treatment for preventing static electricity or the like is performed (hereinafter referred to as an antistatic film) may be used. As the antistatic film, a film with an antistatic material dispersed in a resin, a film with an antistatic material attached thereon, and the like can be given as examples. The film provided with an antistatic material may be a film with an antistatic material provided over one of its surfaces, or a film with an antistatic material provided over each of its surfaces. As for the film with an antistatic material provided over one of its surfaces, the film may be attached to the layer so that the antistatic material is placed on the inner side of the film or the outer side of the film. Note that the antistatic material may be provided over the entire surface of the film, or over a part of the film. As the antistatic material here, a metal, indium tin oxide (ITO), or a surfactant such as an amphoteric surfactant, a cationic surfactant, or a nonionic surfactant can be used. Alternatively, as the antistatic material, a resin material containing cross-linked copolymer having a carboxyl group and a quaternary ammonium base on its side chain, or the like can be used. By attaching, mixing, or applying such a material to a film, an antistatic film can be formed. The sealing is performed using the antistatic film, and thus a semiconductor element can be prevented from being adversely affected due to static electricity from outside when dealt with as a product.

Through the above steps, the semiconductor device of the present invention can be manufactured. Note that in this embodiment mode, an example in which the antenna is provided over the same substrate as the thin film transistor is described; however, the present invention is not limited to this structure. A first substrate over which a layer having a thin film transistor and a second substrate over which a conductive layer functioning as an antenna may be attached with a resin including conductive particles so that the thin film transistor and the antenna may be electrically connected.

Figure 8A:
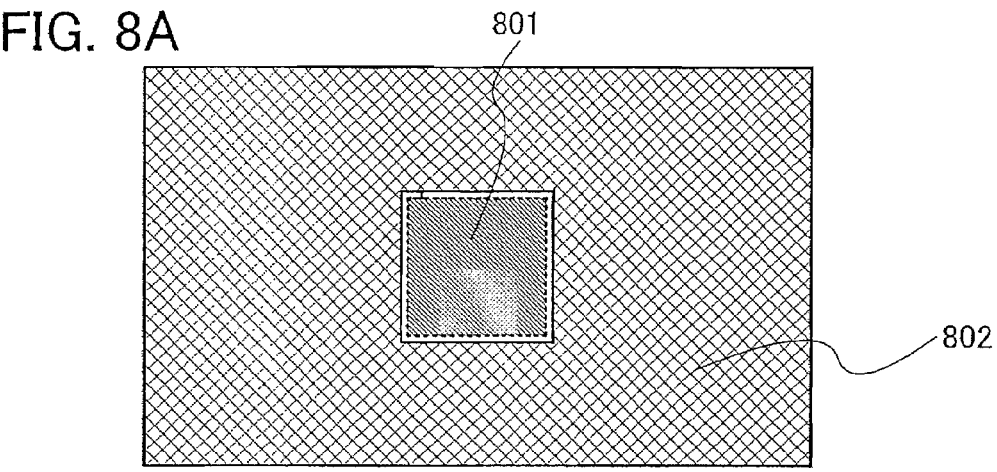
FIGS. 8A to 8E are diagrams showing a semiconductor device of the present invention.
Figure 8B:
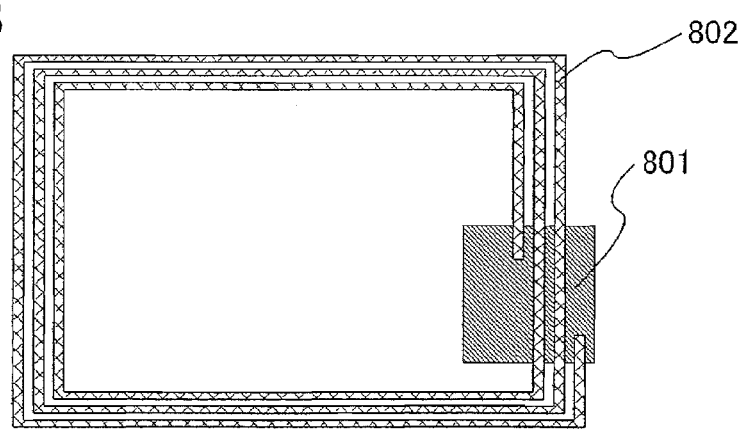
Figure 8C:
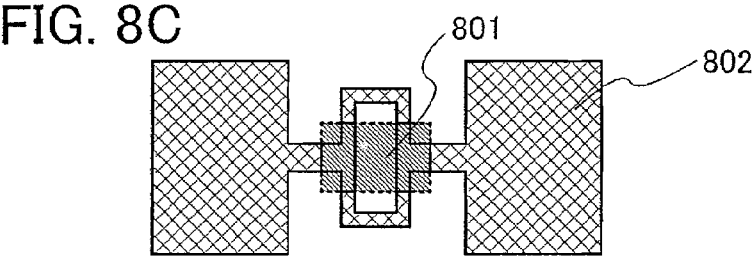
Figure 8D:
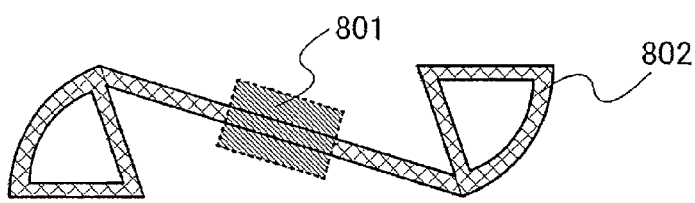
Figure 8E:
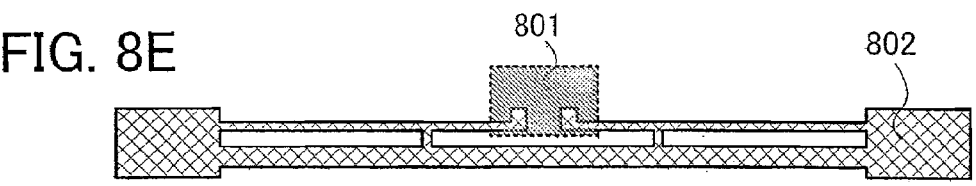

Note that a shape of the antenna is not specifically limited to the one described above. Assuming that a circuit other than the antenna, which is included in the semiconductor device such as an RFID, is, for example, a circuit 801, a structure where an antenna 802 which extends outside a circuit 801 over a substrate is provided as shown in FIG. 8A may be employed. As shown in FIG. 8B, the coiled antenna 802 which is connected to the circuit 801 over a substrate may be employed. Note that the semiconductor device shown in the cross-sectional view described above has a structure where the antenna 802 is provided around the over the circuit 801 as well as around the circuit 801. Alternatively, as shown in FIG. 8C, a structure where the antenna 802 has a shape for receiving a high-frequency electromagnetic wave with respect to the circuit 801 over the substrate may be employed. Alternatively, as shown in FIG. 8D, a structure where the 180° omni-directional (capable of receiving signals in any directions) antenna 802 is formed with respect to the circuit 801 over the substrate may be employed. Further alternatively, as shown in FIG. 8E, a structure where the antenna 802 extended to be long in a stick shape is formed with respect to the circuit 801 over the substrate may be employed. A necessary length for the antenna varies depending on frequency for receiving a signal. For example, when the frequency is 2.45 GHz, the length of the antenna may be approximately 60 mm (½ wavelength) in case that a half-wave dipole antenna is provided and approximately 30 mm (¼ wavelength) in case that a monopole antenna is provided.

Note that in this embodiment mode, the process in which the element such as the thin film transistor is peeled after being formed over a substrate is shown. Alternatively, an element formed over a substrate may be used as a product without being peeled from the substrate. Further, after the element such as the thin film transistor is formed over a glass substrate, the glass substrate is polished from an opposite side of a surface over which the element is formed, so that reduction in film thickness and size of the semiconductor device can be achieved.

Note that this embodiment mode can be implemented in combination with any of the other embodiment modes in this specification.

Embodiment Mode 4

In this embodiment mode, a method for manufacturing a transistor included in the semiconductor device of the present invention, which is different from that of the aforementioned embodiment mode, is described. The transistor in the semiconductor device of the present invention can be formed of a MOS transistor on a single-crystalline substrate instead of the thin film transistor over an insulating substrate, which is described in the aforementioned embodiment mode.

In this embodiment mode, an example of a method for manufacturing a transistor included in a semiconductor device such as an RFID is described with reference to partial cross-sectional views shown in FIGS. 9A to 11.

First, separated element regions 902 and 903 (hereinafter also referred to as regions 902 and 903) are formed in a semiconductor substrate 900 (see FIG. 9A). The regions 902 and 903 provided in the semiconductor substrate 900 are separated from each other by an insulating film 901 (also referred to as a field oxide film). Note that here, an example is described in which an n-type single crystalline silicon substrate is used as the semiconductor substrate 900, and a p-well 904 is provided in the region 903 in the semiconductor substrate 900.

Any semiconductor substrate can be used as the semiconductor substrate 900. For example, a single crystalline silicon substrate having n-type or p-type conductivity, a compound semiconductor substrate (for example, a GaAs substrate, an InP substrate, a GaN substrate, a SiC substrate, a sapphire substrate, or a ZnSe substrate), an SOI (Silicon On Insulator) substrate manufactured by a bonding method or a SIMOX (Separation by IMplanted OXygen) method, or the like can be used.

For the separated element regions 902 and 903, a selective oxidation method (LOCOS (Local Oxidation of Silicon) method), a trench isolation method, or the like can be used as appropriate.

Furthermore, the p-well in the region 903 of the semiconductor substrate 900 can be formed by selective introduction of an impurity element imparting p-type conductivity into the semiconductor substrate 900. As the p-type impurity element, boron (B), aluminum (Al), gallium (Ga), or the like can be used.

Note that although an impurity element is not introduced into the region 902 because the n-type semiconductor substrate is used as the semiconductor substrate 900 in this embodiment mode, an n-well may be formed in the region 902 by introduction of an impurity element imparting n-type conductivity. As the impurity element imparting n-type conductivity, phosphorus (P), arsenic (As), or the like can be used. On the other hand, in the case where a p-type semiconductor substrate is used, an n-well may be formed in the region 902 by introduction of an impurity element imparting n-type conductivity and no impurity element may be introduced into the region 903.

Next, as shown in FIG. 9B, the insulating films 905 and 906 are formed so as to cover the regions 902 and 903 respectively.

The insulating films 905 and 906 can be formed of silicon oxide films by oxidization of surfaces of the regions 902 and 903 in the semiconductor substrate 900 respectively by heat treatment. Alternatively, the insulating films 905 and 906 can be formed as a stacked-layer structure of a silicon oxide film and a silicon film containing oxygen and nitrogen (silicon oxynitride film) by forming the silicon oxide film using a thermal oxidation method and then nitriding the surface of the silicon oxide film by nitridation treatment.

Further alternatively, the insulating films 905 and 906 may be formed using plasma treatment as described above. For example, by performing oxidation treatment or nitridation treatment with high-density plasma treatment to the surfaces of the regions 902 and 903 in the semiconductor substrate 900, silicon oxide ($SiO_x$) films or silicon nitride ($SiN_x$) films can be formed as the insulating films 905 and 906. Further, after oxidation treatment is performed to the surfaces of the regions 902 and 903 with high-density plasma treatment, nitridation treatment may be performed by performing high-density plasma treatment again. In this case, silicon oxide films are formed on the surfaces of the regions 902 and 903, and silicon oxynitride films are formed on the silicon oxide films, so that each of the insulating films 905 and 906 has a stacked-layer structure of the silicon oxide film and the silicon oxynitride film. Further alternatively, after silicon oxide films are faulted on the surfaces of the regions 902 and 903 by a thermal oxidation method, oxidation treatment or nitridation treatment may be performed by high-density plasma treatment.

Note that the insulating films 905 and 906 function as gate insulating films in a transistor to be completed later.

Next, a conductive film is formed so as to cover the insulating films 905 and 906 formed over the regions 902 and 903 as shown in FIG. 9C. Here, a conductive film 907 and a conductive film 908 are sequentially stacked as the conductive film. It is needless to say that the conductive film may be formed with a single-layer structure or a staked-layer structure including three or more layers.

The conductive films 907 and 908 can be formed of an element selected from tantalum (Ta), tungsten (W), titanium (Ti), molybdenum (Mo), aluminum (Al), copper (Cu), chromium (Cr), niobium (Nb), and the like, or an alloy material or a compound material containing the element as a main component. Alternatively, a metal nitride film obtained by nitridation of the element can be used. Further alternatively, a semiconductor material typified by polycrystalline silicon doped with an impurity element such as phosphorus can be used.

Here, the conductive film is formed with a stacked-layer structure by forming the conductive film 907 using tantalum nitride and forming the conductive film 908 using tungsten thereover. Alternatively, a single-layer or stacked-layer film of a tungsten nitride, a molybdenum nitride, or a titanium nitride can be used as the conductive film 907, and a single-layer or stacked-layer film of tantalum, molybdenum, or titanium can be used as the conductive film 908.

Figure 10A:
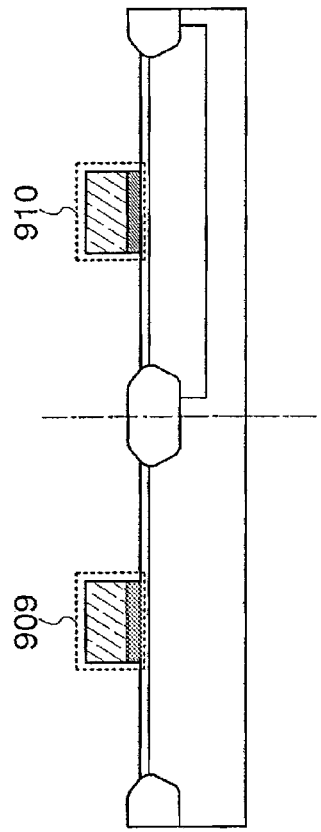
FIGS. 10A to 10C are partial cross-sectional views of a transistor included in a semiconductor device of the present invention.

Next, by selectively etching and removing the conductive films 907 and 908 which are stacked, the conductive films 907 and 908 are partially left over the regions 902 and 903 to form gate electrodes 909 and 910 as shown in FIG. 10A.

Figure 10B:
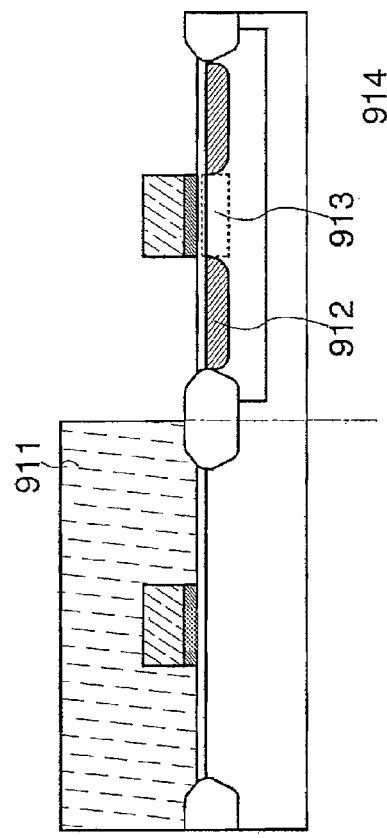

Next, a resist mask 911 is selectively formed so as to cover the region 902 and an impurity element is introduced into the region 903 by using the resist mask 911 and the gate electrode 910 as masks, thereby forming impurity regions (see FIG. 10B). As the impurity element, an impurity element imparting n-type conductivity or an impurity element imparting p-type conductivity is used. As the impurity element imparting n-type conductivity, phosphorus (P), arsenic (As), or the like can be used. As the impurity element imparting p-type conductivity, boron (B), aluminum (Al), gallium (Ga), or the like can be used. In this embodiment, phosphorus (P) is used as the impurity element.

By introduction of the impurity element, an impurity region 912 forming a source region or a drain region and a channel formation region 913 are formed in the region 903 as shown in FIG. 10B.

Figure 10C:
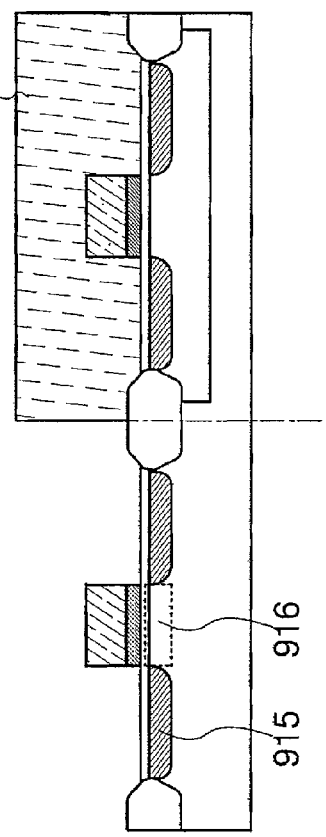

Next, as shown in FIG. 10C, a resist mask 914 is selectively formed so as to cover the region 903, and an impurity element is introduced into the region 902 with the use of the resist mask 914 and the gate electrode 909 as masks, thereby forming an impurity region. As the impurity element, an impurity element imparting n-type conductivity or an impurity element imparting p-type conductivity is used. As the impurity element imparting n-type conductivity, phosphorus (P), arsenic (As), or the like can be used. As the impurity element imparting p-type conductivity, boron (B), aluminum (Al), gallium (Ga), or the like can be used. Here, an impurity element having a conductivity type which is different from that of the impurity element introduced into the region 903 in FIG. 10C (for example, boron (B)) is introduced. As a result, an impurity region 915 forming a source region or a drain region and a channel formation region 916 are formed in the region 902.

Figure 11:
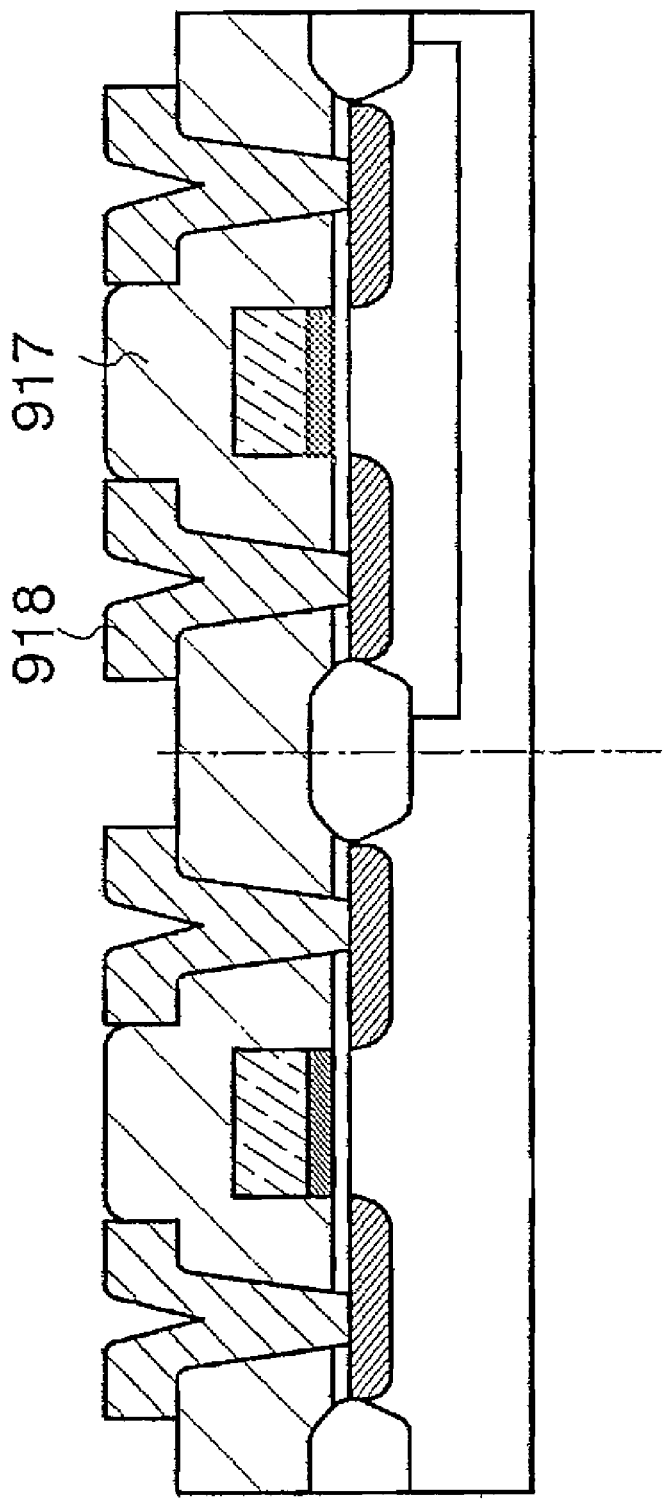
FIG. 11 is a partial cross-sectional view of a transistor included in a semiconductor device of the present invention.

Next, as shown in FIG. 11, a second insulating film 917 is formed so as to cover the insulating films 905 and 906 and the gate electrodes 909 and 910; and over the second insulating film 917, a wiring 918 is formed to be electrically connected to the impurity regions 912 and 915 formed in the regions 902 and 903 respectively.

The second insulating film 917 can be formed by a CVD method, a sputtering method, or the like to have a single-layer structure or a stacked-layer structure of an insulating film containing oxygen or nitrogen, such as a silicon oxide ($SiO_x$) film, a silicon nitride ($SiN_x$) film, a silicon oxynitride ($SiO_xN_y$) (x>y) film, or a silicon nitride oxide ($SiN_xO_y$) (x>y) film; a film containing carbon such as DLC (Diamond Like Carbon); or a film made of an organic material such as epoxy, polyimide, polyamide, polyvinylphenol, benzocyclobutene, or acrylic; or a siloxane material such as a siloxane resin. The siloxane material is a material including a Si—O—Si bond. Siloxane is composed of a skeleton formed by the bond of silicon (Si) and oxygen (O), in which an organic group containing at least hydrogen (such as an alkyl group or aromatic hydrocarbon) is contained as a substituent. Alternatively, a fluoro group may be used as the substituent. Further alternatively, a fluoro group and an organic group containing at least hydrogen may be used as the substituent.

The wiring 918 is formed as a single layer or stacked layers using an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material including the above-described element as its main component, by a CVD method, a sputtering method, or the like. An alloy material containing aluminum as its main component corresponds to a material which contains aluminum as its main component and also contains nickel, or an alloy material which contains aluminum as its main component and also contains nickel and one or both of carbon and silicon, for example. The wiring 918 preferably employs, for example, a stacked layer structure of a barrier film, an aluminum-silicon (Al—Si) film, and a barrier film, or a stacked-layer structure of a barrier film, an aluminum-silicon (Al—Si) film, a titanium nitride (TiN) film, and a barrier film. It is to be noted that a barrier film corresponds to a thin film formed by using titanium, a nitride of titanium, molybdenum, or a nitride of molybdenum. Aluminum and aluminum silicon which have low resistance and are inexpensive are optimal materials for forming the wiring 918. In addition, generation of a hillock of aluminum or aluminum silicon can be prevented when upper and lower barrier layers are formed. Furthermore, when the barrier film is formed by using titanium that is a highly-reducible element, even if a thin natural oxide film is formed over the crystalline semiconductor film, the natural oxide film can be reduced so that preferable contact with the crystalline semiconductor film can be obtained.

Note that a structure of the transistor is not limited to the abovementioned structure. For example, an inverse staggered structure, a FinFET structure, or the like may be employed. Note also that with the FinFET structure, a short-channel effect associated with miniaturization of a size of a transistor can be suppressed.

Further, this embodiment mode can be implemented in free combination with any of the other embodiment modes in this specification.

Embodiment Mode 5

In this embodiment mode, a method for manufacturing a transistor included in the semiconductor device of the present invention, which is different from that of the aforementioned embodiment mode, is described. The transistor in the semiconductor device of the present invention may be formed of a MOS transistor provided by a manufacturing method different from that of the MOS transistor on the single crystalline substrate, which is described in the aforementioned embodiment mode.

In this embodiment mode, an example of a method for manufacturing a transistor included in a semiconductor device such as an RFID is described with reference to partial cross-sectional views shown in FIGS. 12A to 15B.

Figure 12A:
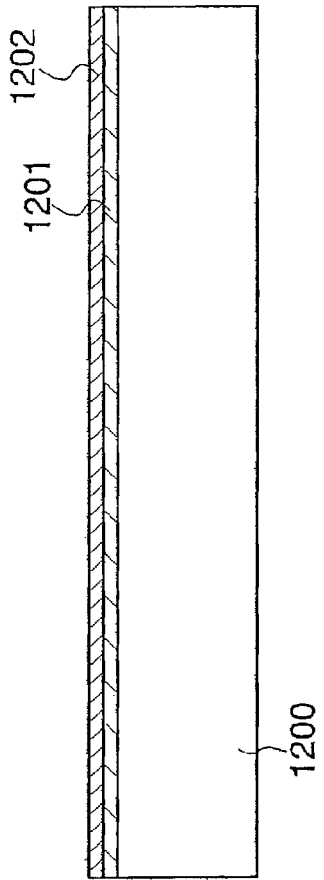
FIGS. 12A to 12C are partial cross-sectional views of a transistor included in a semiconductor device of the present invention.

First, an insulating film is formed over a substrate 1200 as shown in FIG. 12A. Here, n-type single crystalline silicon is used for the substrate 1200, and an insulating film 1201 and an insulating film 1202 are formed over the substrate 1200. For example, a silicon oxide ($SiO_x$) film is formed as the insulating film 1201 by performing heat treatment to the substrate 1200, and a silicon nitride ($SiN_x$) film is formed over the insulating film 1201 by a CVD method.

Any semiconductor substrate can be used as the substrate 1200. For example, a single crystalline silicon substrate having n-type or p-type conductivity, a compound semiconductor substrate (for example, a GaAs substrate, an InP substrate, a GaN substrate, an SiC substrate, a sapphire substrate, or a ZnSe substrate), an SOI (Silicon On Insulator) substrate manufactured by a bonding method or a SIMOX (Separation by IMplanted OXygen) method, or the like can be used.

Further, the insulating film 1202 may be provided by nitridation of the insulating film 1201 by high-density plasma treatment after formation of the insulating film 1201. Note that the insulating film to be provided over the substrate 1200 may be formed with a single-layer structure or a staked-layer structure including three or more layers.

Figure 12B:
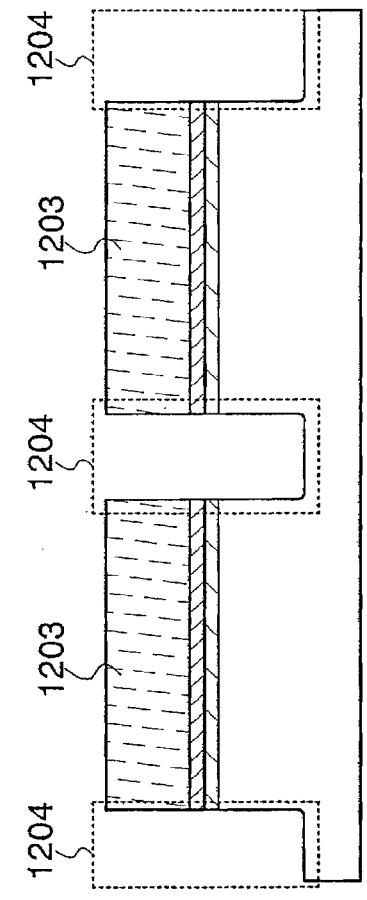

Next, as shown in FIG. 12B, patterns of resist masks 1203 are selectively formed over the insulating film 1202, and etching is selectively performed using the resist masks 1203 as masks, thereby selectively forming depressions 1204 in the substrate 1200. Etching of the substrate 1200 and the insulating films 1201 and 1202 can be performed by dry etching utilizing plasma.

Figure 12C:
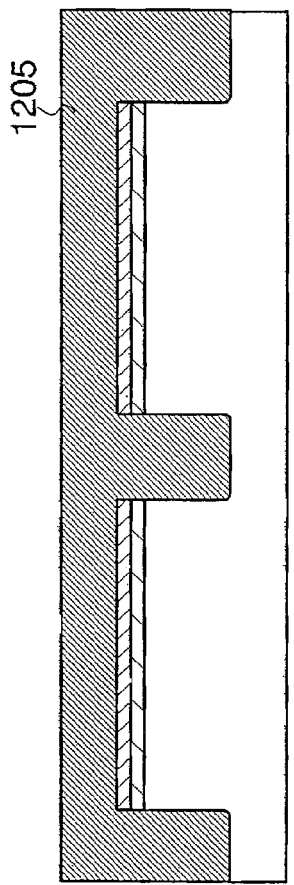

Next, as shown in FIG. 12C, after the pattern of the resist mask 1203 is removed, an insulating film 1205 is formed so as to fill the depressions 1204 formed in the substrate 1200.

The insulating film 1205 is formed using an insulating material such as a silicon oxide, a silicon nitride, a silicon oxynitride ($SiO_xN_y$) (x>y>0), or a silicon nitride oxide ($SiN_xO_y$) (x>y>0) by a CVD method, a sputtering method, or the like. Here, a silicon oxide film is formed as the insulating film 1205 with the use of a TEOS (Tetraethoxysilane) gas by a normal-pressure CVD method or a low-pressure CVD method.

Next, a surface of the substrate 1200 is exposed by performing grinding treatment, polishing treatment, or CMP (Chemical Mechanical Polishing) treatment. Here, when the surface of the substrate 1200 is exposed, regions 1207 and 1208 are each provided between insulating films 1206 formed in the depressions 1204 of the substrate 1200. Note that the insulating films 1206 are formed by removing the insulating film 1205 formed over the surface of the substrate 1200, by grinding treatment, polishing treatment, or CMP treatment. Then, an impurity element imparting p-type conductivity is selectively introduced, thereby forming a p-well 1209 in the region 1208.

As the impurity element imparting p-type conductivity, boron (B), aluminum (Al), gallium (Ga), or the like can be used. Here, boron (B) is introduced into the region 1208 as the impurity element.

Note that although an impurity element is not introduced into the region 1207 because the n-type semiconductor substrate is used as the substrate 1200 in this embodiment mode, an n-well may be formed in the region 1207 by introduction of an impurity element imparting n-type conductivity. As the impurity element imparting n-type conductivity, phosphorus (P), arsenic (As), or the like can be used.

On the other hand, in the case where a p-type semiconductor substrate is used, an impurity element imparting n-type conductivity may be introduced only into the region 1207 so as to form an n-well, not into the region 1208.

Figure 13A:
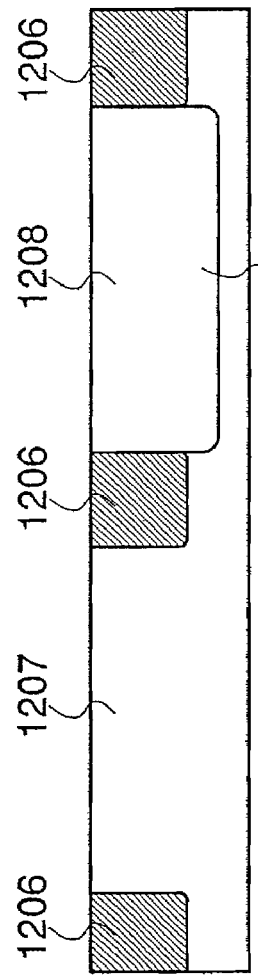
FIGS. 13A to 13C are partial cross-sectional views of a transistor included in a semiconductor device of the present invention.
Figure 13B:
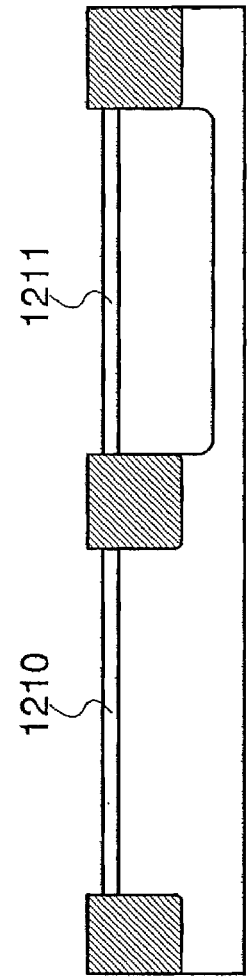

Next, as shown in FIG. 13B, insulating films 1210 and 1211 are formed on the surfaces of the regions 1207 and 1208 in the substrate 1200, respectively.

Each of the insulating films 1210 and 1211 can be formed of a silicon oxide film by oxidization of the surfaces of the regions 1207 and 1208 in the substrate 1200 by heat treatment. Alternatively, each of the first insulating films 1210 and 1211 can be formed as a stacked-layer structure of a silicon oxide film and a film containing oxygen and nitrogen (silicon oxynitride film) by forming the silicon oxide film by a thermal oxidation method and then nitriding the surface of the silicon oxide film by nitridation treatment.

Further alternatively, as described above, the insulating films 1210 and 1211 may be formed using plasma treatment. For example, oxidation treatment or nitridation treatment is performed by high-density plasma treatment to the surfaces of the regions 1207 and 1208 provided in the substrate 1200, so that silicon oxide ($SiO_x$) films or silicon nitride ($SiN_x$) films can be formed as the insulating films 1210 and 1211. Alternatively, after oxidation treatment is performed on the surfaces of the regions 1207 and 1208 by high-density plasma treatment, high-density plasma treatment may be performed again to perform nitridation treatment. In this case, silicon oxide films are formed on the surfaces of the regions 1207 and 1208, and silicon oxynitride films are formed over the silicon oxide films, so that each of the insulating films 1210 and 1211 is formed as a film having a stacked-layer structure of the silicon oxide film and the silicon oxynitride film. Further alternatively, after silicon oxide films are formed on the surfaces of the regions 1207 and 1208 by a thermal oxidation method, oxidation treatment or nitridation treatment may be performed by high-density plasma treatment.

Note that the insulating films 1210 and 1211 formed over the regions 1207 and 1208 in the substrate 1200 function as gate insulating films in a transistor to be completed later.

Figure 13C:
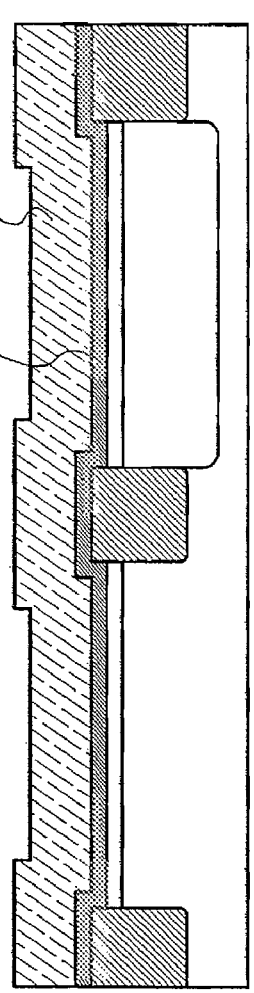

Next, as shown in FIG. 13C, a conductive film is formed so as to cover the insulating films 1210 and 1211 formed over the regions 1207 and 1208 provided in the substrate 1200. Here, a conductive film 1212 and a conductive film 1213 are sequentially stacked as the conductive film. It is needless to say that the conductive film may be formed with a single-layer structure or a staked-layer structure including three or more layers.

The conductive films 1212 and 1213 can be formed of an element selected from tantalum (Ta), tungsten (W), titanium (Ti), molybdenum (Mo), aluminum (Al), copper (Cu), chromium (Cr), niobium (Nb), and the like, or an alloy material or a compound material containing the element as a main component. Alternatively, a metal nitride film obtained by nitridation of the element may be used. Further alternatively, a semiconductor material typified by polycrystalline silicon doped with an impurity element such as phosphorus may be used.

Here, the conductive film is formed to have a stacked-layer structure by formation of the conductive film 1212 using tantalum nitride and formation of the conductive film 1213 using tungsten thereover. Alternatively, a single-layer or stacked-layer film of tantalum nitride, tungsten nitride, molybdenum nitride, or titanium nitride can be used as the conductive film 1212, and a single-layer or stacked-layer film of tungsten, tantalum, molybdenum, or titanium can be used as the conductive film 1213.

Figure 14A:
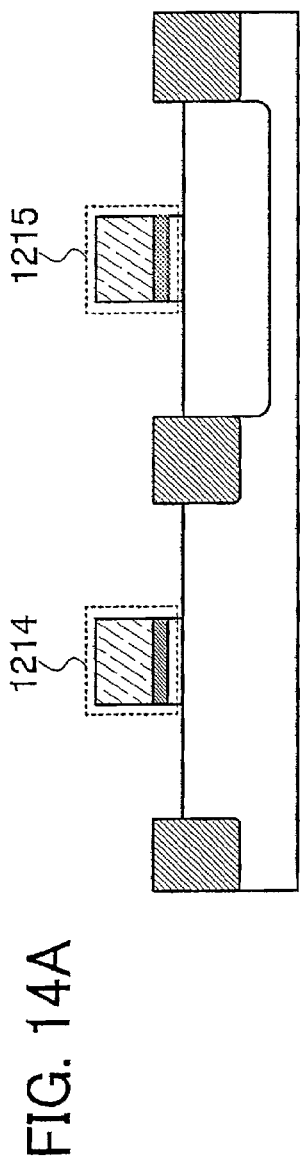
FIGS. 14A to 14C are partial cross-sectional views of a transistor included in a semiconductor device of the present invention.

Next, as shown in FIG. 14A, by selectively etching and removing the conductive films 1212 and 1213 which are stacked, the conductive films 1212 and 1213 are partially left over the regions 1207 and 1208 in the substrate 1200 to form conductive films 1214 and 1215 each functioning as a gate electrode. In addition, here, surfaces of parts of the regions 1207 and 1208 which are not overlapped with the conductive films 1214 and 1215 are exposed in the substrate 1200.

Specifically, in the region 1207 in the substrate 1200, a part of the insulating film 1210 formed below the conductive film 1214, which is not overlapped with the conductive film 1214, is selectively removed so that ends of the conductive film 1214 and the insulating film 1210 are roughly aligned with each other. In the region 1208 in the substrate 1200, a part of the insulating film 1211 formed below the conductive film 1215, which is not overlapped with the conductive film 1215, is selectively removed so that ends of the conductive film 1215 and the insulating film 1211 are roughly aligned with each other.

In this case, parts of the insulating films and the like which are not overlapped with the conductive films 1214 and 1215 may be removed at the same time as the formation of the conductive films 1214 and 1215; or may be removed after formation of the conductive films 1214 and 1215, by using the remaining resist or the conductive films 1214 and 1215 as masks.

Figure 14B:
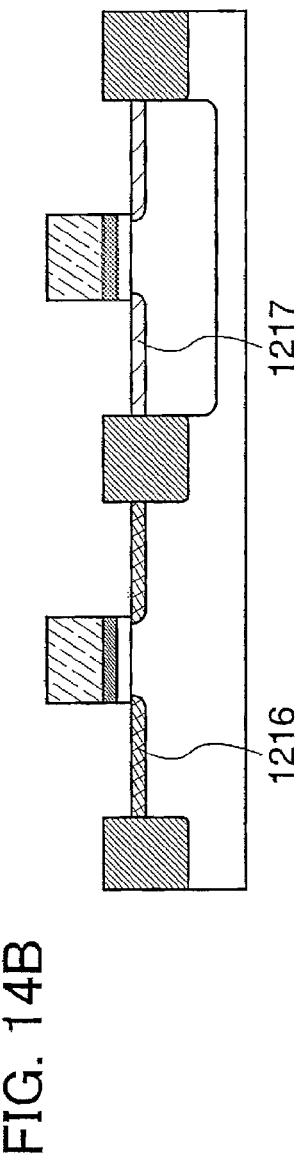

Next, as shown in FIG. 14B, an impurity element is selectively introduced into the regions 1207 and 1208 in the substrate 1200. Here, an impurity element imparting n-type conductivity is selectively introduced into the region 1208 at low concentration with the use of the conductive film 1215 as a mask to form an impurity region 1217. On the other hand, an impurity element imparting p-type conductivity is selectively introduced into the region 1207 at low concentration with the use of the conductive film 1214 as a mask to form an impurity region 1216. As the impurity element imparting n-type conductivity, phosphorus (P), arsenic (As), or the like can be used. As the impurity element imparting p-type conductivity, boron (B), aluminum (Al), gallium (Ga), or the like can be used.

Next, sidewalls 1218 are fanned in contact with side surfaces of the conductive films 1214 and 1215. Specifically, a film including an inorganic material such as silicon, an oxide of silicon, or a nitride of silicon, or a film including an organic material such as an organic resin is formed as a single layer or a stacked layer by a plasma CVD method, a sputtering method, or the like. Then, the insulating film is selectively etched by anisotropic etching mainly in the perpendicular direction, such that the insulating film is formed in contact with the side surfaces of the conductive films 1214 and 1215. Note that the sidewalls 1218 are used as masks for doping when LDD (Lightly Doped Drain) regions are formed. Further, here, the sidewalls 1218 are formed in contact with side surfaces of insulating films and floating gate electrodes formed below the conductive films 1214 and 1215 as well.

Figure 14C:
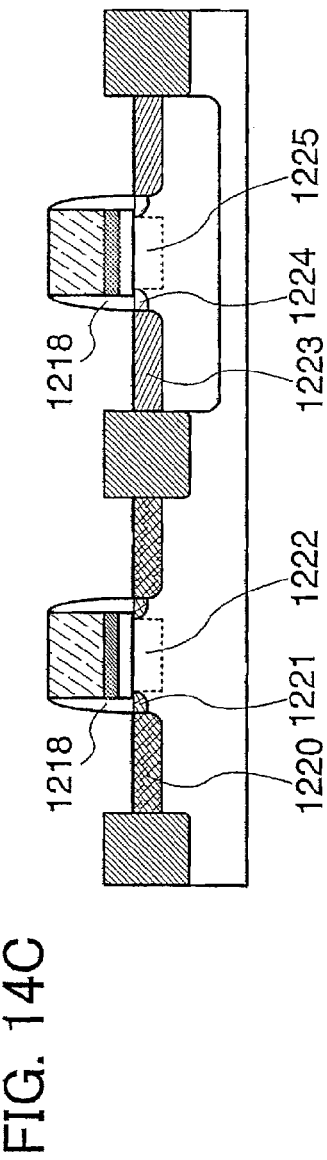

Subsequently, an impurity element is introduced into the regions 1207 and 1208 in the substrate 1200 with the use of the sidewalls 1218 and the conductive films 1214 and 1215 as masks, thereby forming impurity regions functioning as source regions or drain regions (see FIG. 14C). Here, an impurity element imparting n-type conductivity is introduced into the region 1208 in the substrate 1200 at high concentration with the use of the sidewalls 1218 and the conductive film 1215 as masks, while an impurity element imparting p-type conductivity is introduced into the region 1207 at high concentration with the use of the sidewalls 1218 and the conductive film 1214 as masks.

As a result, in the region 1207 in the substrate 1200, impurity regions 1220 forming source and drain regions, low-concentration impurity regions 1221 forming LDD regions, and a channel formation region 1222 are formed. In the region 1208 in the substrate 1200, impurity regions 1223 forming source and drain regions, low-concentration impurity regions 1224 forming LDD regions, and a channel formation region 1225 are formed.

Note that in this embodiment mode, introduction of the impurity element is performed under a condition in which the parts of the regions 1207 and 1208 in the substrate 1200, which are not overlapped with the conductive films 1214 and 1215, are exposed. Therefore, the channel formation regions 1222 and 1225 formed in the regions 1207 and 1208 in the substrate 1200 respectively can be formed in a self-aligned manner with the conductive films 1214 and 1215.

Figure 15A:
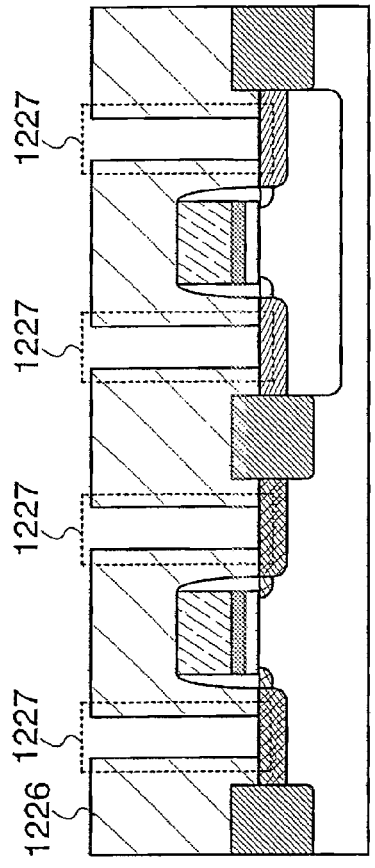
FIGS. 15A and 15B are partial cross-sectional views of a transistor included in a semiconductor device of the present invention.

Next, as shown in FIG. 15A, a second insulating film 1226 is formed so as to cover the insulating films, the conductive films, or the like provided over the regions 1207 and 1208 in the substrate 1200, and opening portions 1227 are formed in the insulating film 1226.

The second insulating film 1226 can be formed with a single-layer or stacked-layer structure of an insulating film containing oxygen or nitrogen, such as silicon oxide ($SiO_x$), silicon nitride ($SiN_x$), silicon oxynitride ($SiO_xN_y$) (x>y), or silicon nitride oxide ($SiN_xO_y$) (x>y); a film containing carbon such as DLC (Diamond Like Carbon); an organic material such as epoxy, polyimide, polyamide, polyvinyl phenol, benzocyclobutene, or acrylic; or a siloxane material such as a siloxane resin, by a CVD method, a sputtering method, or the like. Note that the siloxane material is a material having a Si—O—Si bond. Siloxane has a skeleton structure containing a bond of silicon (Si) and oxygen (O). As a substituent, an organic group containing at least hydrogen (for example, an alkyl group or aromatic hydrocarbon) can be used. Alternatively, a fluoro group may be used as a substituent. Further alternatively, as a substituent, an organic group containing at least hydrogen and a fluoro group may be used.

Figure 15B:
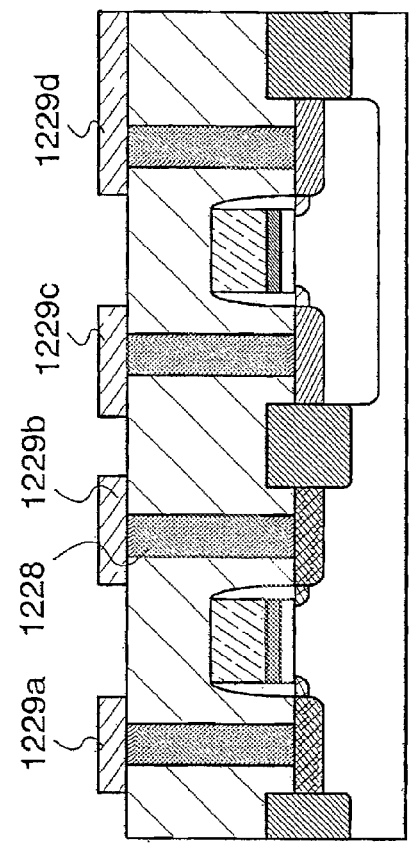
Figure 17:
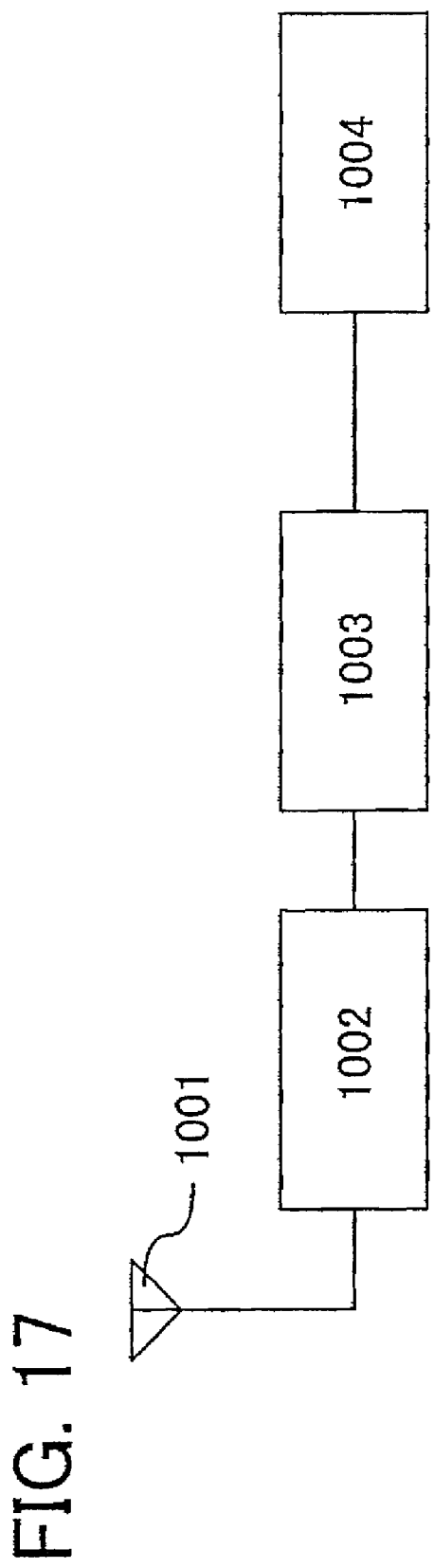
FIG. 17 is a diagram showing a conventional structure.

Next, as shown in FIG. 15B, conductive films 1228 are formed in the opening portions 1227 by a CVD method, and conductive films 1229a to 1229d are selectively formed over the insulating film 1226 so as to be electrically connected to the conductive films 1228.

Each of the conductive films 1228, and 1229a to 1229d is formed as a single layer or a stacked layer of an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing the element as a main component by a CVD method, a sputtering method, or the like. An alloy material containing aluminum as its main component corresponds to a material which contains aluminum as its main component and also contains nickel, or an alloy material which contains aluminum as its main component and also contains nickel and one or both of carbon and silicon, for example. Each of the conductive films 1228, and 1229a to 1229d preferably employ, for example, a stacked layer structure of a barrier film, an aluminum-silicon (Al—Si) film, and a barrier film, or a stacked layer structure of a barrier film, an aluminum-silicon (Al—Si) film, a titanium nitride (TiN) film, and a barrier film. It is to be noted that a barrier film corresponds to a thin film formed by using titanium, a nitride of titanium, molybdenum, or a nitride of molybdenum. Aluminum and aluminum silicon which have low resistance and are inexpensive are optimal materials for forming the conductive film 1228. In addition, generation of a hillock of aluminum or aluminum silicon can be prevented when upper and lower barrier layers are formed. Furthermore, when the barrier film is formed using titanium that is a highly-reducible element, even if a thin natural oxide film is formed over the crystalline semiconductor film, the natural oxide film is reduced so that preferable contact with the crystalline semiconductor film can be obtained. Here, each of the conductive films 1228 can be formed by selective growth of tungsten (W) by a CVD method.

Through the above-described steps, a semiconductor device provided with a p-channel transistor formed in the region 1207 and an n-channel transistor formed in the region 1208 in the substrate 1200 can be obtained.

Note that a structure of the transistor is not limited to the abovementioned structure. For example, an inverse stagger structure, a FinFET structure, or the like may be employed. Note also that with the FinFET structure, a short-channel effect associated with miniaturization of a size of a transistor can be suppressed.

Further, this embodiment mode can be implemented in free combination with any of the other embodiment modes in this specification.

Embodiment Mode 6

In this embodiment mode, uses of a semiconductor device of the present invention, such as an RFID, is described. A semiconductor device of the present invention can be used as a so-called ID label, ID tag, or ID card provided in, for example, bills, coins, securities, bearer bonds, documents (such as driver's licenses or resident's cards), packaging containers (such as wrapping paper or bottles), storage media (such as DVD software or video tapes), vehicles (such as bicycles), personal belongings (such as bags or glasses), foods, plants, animals, human bodies, clothing, everyday articles, or tags on products such as an electronic appliances or on packs. Electronic appliances refer to a liquid crystal display device, an EL display device, a television set (also called a TV set simply, a TV receiver, or a television receiver), a mobile phone, and the like.

In this embodiment, an application of the present invention and an example of a product with the semiconductor device of the present invention are described with reference to FIGS. 16A to 16E.

FIG. 16A shows an example of a state of completed products of a semiconductor device including the RFID of the invention. A plurality of ID labels 1603 each incorporating an RFID 1602 is formed on a label board 1601 (separate paper). The ID labels 1603 are put in a box 1604. On the ID label 1603, information on a product or service (for example, a name of the product, a brand, a trademark, a trademark owner, a seller, a manufacturer, and the like) is written. In addition, an ID number which is specific to the product (or the kind of the product) is assigned to the incorporated RFID, so that forgery, infringement of intellectual property rights such as a trademark and a patent, and illegality such as unfair competition can be figured out. Further, a lot of information which is too much to be written clearly on a container or a label of the product, for example, production area, selling area, quality, raw material, efficacy, use, quantity, shape, price, production method, directions for use, production time, time of the use, expiration date, instructions of the product, information on the intellectual property of the product, and the like can be inputted in the RFID; therefore, a trader and a consumer can access the information with the use of a simple reader. The producer can also easily rewrite or delete the information, while the trader and the consumer are not allowed to rewrite or delete the information.

FIG. 16B shows an ID tag 1611 with a label shape, in which an RFID 1612 is incorporated. Mounting the ID tag 1611 on a product allows the product to be managed easily. For example, when the product is stolen, the thief can be figured out quickly by tracing of the pathway of the product. Thus, products which are superior in so-called traceability can be distributed by being provided with the ID tag.

FIG. 16C shows an example of a state of a completed product of an ID card 1621 including an RFID 1622 of the present invention. The ID card 1621 includes all kinds of cards such as a cash card, a credit card, a prepaid card, an electronic ticket, electronic money, a telephone card, and a membership card.

FIG. 16D shows an example of a state of a completed product of a bearer bond 1631. An RFID 1632 is embedded in the bearer bond 1631 and is protected by a resin formed in the periphery thereof. Here, the resin is filled with a filler. The bearer bond 1631 can be formed in the same manner as an ID label, an ID tag, and an ID card of the present invention. Note that the aforementioned bearer bonds include stamps, tickets, admission tickets, merchandise coupons, book coupons, stationery coupons, beer coupons, rice coupons, various gift coupons, various service coupons, and the like. Needless to say, it is not limited thereto. In addition, when the RFID 1632 of the present invention is provided in bills, coins, securities, bearer bonds, documents, or the like, an authentication function can be provided. By utilization of the authentication function, forgery can be prevented.

FIG. 16E shows a book 1643 to which an ID label 1641 including an RFID 1642 of the present invention is attached. The RFID 1642 of the present invention is fixed on objects by, for example, being attached to a surface or being embedded therein. As shown in FIG. 16E, the RFID 1642 can be embedded in paper of a book, or embedded in an organic resin of a package. Since the RFID 1642 of the present invention can reduced in size, thickness, and weight, it can be fixed on objects without spoiling the design thereof.

In addition, although not shown here, the efficiency of a system such as an inspection system can be improved by provision of the RFID of the present invention in, for example, packaging containers, storage media, personal belongings, foods, clothing, everyday articles, electronic appliances, or the like. Further, counterfeits and theft can be prevented by provision of the RFID on vehicles. Individual creatures such as animals can be easily identified by being implanted with the RFID. For example, year of birth, sex, breed, and the like can be easily identified by implantation of the RFID in creatures such as domestic animals.

Thus, the RFID of the present invention can be used by being provided in any object (including a creature).

Further, this embodiment mode can be implemented in free combination with any of the other embodiment modes in this specification.

This application is based on Japanese Patent Application serial no. 2006-180585 filed in Japan Patent Office on 30, Jun. 2006, the entire contents of which are hereby incorporated by reference.

What is claimed is:

1. A semiconductor device comprising:
   an antenna;
   a rectifier circuit electrically connected to the antenna;
   a regulator circuit electrically connected to the rectifier circuit and a first power source line connected to an output terminal of the regulator circuit;
   a first circuit including a clock generating circuit, the first circuit being electrically connected to the first power source line; and
   a demodulation circuit and a modulation circuit, at least one of which being directly connected to a second power source line connected to an output of the rectifier circuit.

2. The semiconductor device according to claim 1,
   wherein the rectifier circuit is configured to supply a first power source potential, which is output from the rectifier circuit, to the regulator circuit, to the demodulation circuit, and to the modulation circuit, and
   wherein the regulator circuit is configured to supply a second power source potential, which is output from the regulator circuit, to the first circuit.

3. The semiconductor device according to claim 1,
   wherein the demodulation circuit and the modulation circuit are part of a second circuit, and
   wherein the first circuit and the second circuit are connected through a level shifter circuit.

4. The semiconductor device according to claim 1, wherein the regulator circuit comprises:
   an operational amplifier;
   a zener diode electrically connected to one of an inverting input terminal of the operational amplifier and a non-inverting input terminal of the operational amplifier; and
   a transistor,
   wherein a gate of the transistor is electrically connected to an output terminal of the operational amplifier, and
   wherein one of a source of the transistor and a drain of the transistor is electrically connected to the other one of the inverting input terminal of the operational amplifier and the non-inverting input terminal of the operational amplifier.

5. The semiconductor device according to claim 1, wherein the second circuit further comprises a memory circuit.

6. The semiconductor device according to claim 1,
   wherein the first circuit is configured to be powered by the rectifier circuit through the regulator circuit, and
   wherein the at least one of the demodulation circuit and the modulation circuit is configured to be directly powered by the rectifier circuit.

7. A semiconductor device comprising:
   an antenna;
   a rectifier circuit electrically connected to the antenna;
   a first regulator circuit electrically connected to the rectifier circuit, and a first power source line connected to an output terminal of the first regulator circuit;
   a second regulator circuit electrically connected to the rectifier circuit, and a second power source line connected to an output terminal of the second regulator circuit;
   a first circuit including a clock generating circuit, the first circuit being electrically connected to the first power source line; and
   a demodulation circuit and a modulation circuit, at least one of which being directly connected to the second power source line.

8. The semiconductor device according to claim 7,
   wherein the rectifier circuit is configured to supply a first power source potential, which is output from the rectifier circuit, to the first regulator circuit and the second regulator circuit,
   wherein the first regulator circuit is configured to supply a second power source potential, which is output from the first regulator circuit, to the first circuit, and
   wherein the second regulator circuit is configured to supply a third power source potential, which is output from the second regulator circuit, to the demodulation circuit, and to the modulation circuit.

9. The semiconductor device according to claim 7,
   wherein the demodulation circuit and the modulation circuit are part of a second circuit, and
   wherein the first circuit and the second circuit are connected through a level shifter circuit.

10. The semiconductor device according to claim 7, wherein the first regulator circuit comprises:
    an operational amplifier;
    a zener diode electrically connected to one of an inverting input terminal of the operational amplifier and a non-inverting input terminal of the operational amplifier; and
    a transistor,
    wherein a gate of the transistor is electrically connected to an output terminal of the operational amplifier, and
    wherein one of a source of the transistor and a drain of the transistor is electrically connected to the other one of the inverting input terminal of the operational amplifier and the non-inverting input terminal of the operational amplifier.

11. The semiconductor device according to claim 7, wherein the second circuit further comprises a memory circuit.

12. The semiconductor device according to claim 7, wherein the second regulator circuit has a smaller layout area than the first regulator circuit.

13. The semiconductor device according to claim 7,
    wherein the first circuit is configured to be powered by the rectifier circuit through the first regulator circuit, and
    wherein the at least one of the demodulation circuit and the modulation circuit is configured to be powered by the rectifier circuit through the second regulator circuit.

14. A semiconductor device comprising:
an antenna;
a rectifier circuit electrically connected to the antenna;
a regulator circuit electrically connected to the rectifier circuit, and a first power source line connected to an output terminal of the regulator circuit;
a voltage limiter circuit electrically connected to the rectifier circuit, and a second power source line connected to an output terminal of the voltage limiter circuit;
a first circuit including a clock generating circuit, the first circuit being electrically connected to the first power source line; and
a demodulation circuit and a modulation circuit, at least one of which being directly connected to the second power source line.

15. The semiconductor device according to claim 14,
wherein the rectifier circuit is configured to supply a first power source potential, which is output from the rectifier circuit, to the regulator circuit and the voltage limiter circuit,
wherein the regulator circuit is configured to supply a second power source potential, which is output from the regulator circuit, to the first circuit, and
wherein the voltage limiter circuit is configured to supply a third power source potential, which is output from the voltage limiter circuit, to the demodulation circuit, and to the modulation circuit.

16. The semiconductor device according to claim 14,
wherein the demodulation circuit and the modulation circuit are part of a second circuit, and
wherein the first circuit and the second circuit are connected through a level shifter circuit.

17. The semiconductor device according to claim 14, wherein the regulator circuit comprises:
an operational amplifier;
a zener diode electrically connected to one of an inverting input terminal of the operational amplifier and a non-inverting input terminal of the operational amplifier; and
a transistor,
wherein a gate of the transistor is electrically connected to an output terminal of the operational amplifier, and
wherein one of a source of the transistor or a drain of the transistor is electrically connected to the other one of the inverting input terminal of the operational amplifier and the non-inverting input terminal of the operational amplifier.

18. The semiconductor device according to claim 14, wherein the second circuit further comprises a memory circuit.

19. The semiconductor device according to claim 14, wherein the voltage limiter circuit comprises one selected from the group consisting of a Schottky-barrier diode, a PIN diode, a PN diode, and a diode-connected transistor.

20. The semiconductor device according to claim 14,
wherein the first circuit is configured to be powered by the rectifier circuit through the regulator circuit, and
wherein the at least one of the demodulation circuit and the modulation circuit is configured to be powered by the rectifier circuit through the voltage limiter circuit.

* * * * *